(12) United States Patent
Podgorski et al.

(10) Patent No.: US 12,468,136 B2
(45) Date of Patent: Nov. 11, 2025

(54) RANDOM ACCESS PROJECTION MICROSCOPY

(71) Applicant: Howard Hughes Medical Institute, Ashburn, VA (US)

(72) Inventors: Kaspar Podgorski, Ashburn, VA (US); Daniel Flickinger, Frederick, MD (US)

(73) Assignee: Howard Hughes Medical Institute, Ashburn, VA (US)

( * ) Notice: Subject to any disclaimer, the term of this patent is extended or adjusted under 35 U.S.C. 154(b) by 726 days.

(21) Appl. No.: 17/755,836

(22) PCT Filed: Nov. 11, 2020

(86) PCT No.: PCT/US2020/070770
§ 371 (c)(1),
(2) Date: May 10, 2022

(87) PCT Pub. No.: WO2021/097482
PCT Pub. Date: May 20, 2021

(65) Prior Publication Data
US 2022/0382031 A1 Dec. 1, 2022

Related U.S. Application Data

(60) Provisional application No. 62/933,804, filed on Nov. 11, 2019.

(51) Int. Cl.
*G02B 21/00* (2006.01)
*G02B 21/06* (2006.01)
(Continued)

(52) U.S. Cl.
CPC ......... *G02B 21/0076* (2013.01); *G02B 21/06* (2013.01); *G02B 26/0833* (2013.01); *G02B 26/123* (2013.01)

(58) Field of Classification Search
CPC .......................... G02B 21/0076; G02B 21/06; G02B 26/0833; G02B 26/123; G02B 26/127;
(Continued)

(56) References Cited

U.S. PATENT DOCUMENTS 5,921,650 A 7/1999 Doany et al.
6,028,306 A 2/2000 Hayashi
(Continued)

FOREIGN PATENT DOCUMENTS

DE 10118463 A1 10/2002
DE 102006009831 A1 9/2007
(Continued)

OTHER PUBLICATIONS

International Search Report and Written Opinion for Application PCT/US2018/031431, mailed on Jul. 9, 2018, 15 pages.
(Continued)

*Primary Examiner* — David P Porta
*Assistant Examiner* — Gisselle M Gutierrez
(74) *Attorney, Agent, or Firm* — Brake Hughes Bellermann LLP

(57) ABSTRACT

A method of imaging a sample providing light from a light source, directing the provided light into an extended focus, scanning the extended focus across a wavefront modulating element that modulates amplitudes of the light along the extended focus, providing the modulated light to the sample, detecting light emitted from the sample in response to excitation by the modulated light, and generating an image of the sample based on the detected fluorescence emission light.

27 Claims, 15 Drawing Sheets

(51) Int. Cl.
  *G02B 26/08* (2006.01)
  *G02B 26/12* (2006.01)
(58) Field of Classification Search
  CPC .. G02B 2207/114; G02B 26/12; G02B 21/16;
              G02B 21/002; G01N 21/6458
  See application file for complete search history.

(56) References Cited

U.S. PATENT DOCUMENTS

| | | |
|---|---|---|
| 10,830,701 B2 | 11/2020 | Podgorski et al. |
| 2013/0126755 A1 | 5/2013 | Kemnitz |
| 2013/0126756 A1 | 5/2013 | Xu et al. |
| 2015/0145981 A1 | 5/2015 | Anhut et al. |
| 2015/0157210 A1 | 6/2015 | Zhang et al. |
| 2017/0242232 A1 | 8/2017 | Leger et al. |
| 2018/0177401 A1 | 6/2018 | Yang et al. |
| 2018/0321154 A1 | 11/2018 | Podgorski et al. |
| 2019/0113731 A1 | 4/2019 | Betzig et al. |

FOREIGN PATENT DOCUMENTS

| | | |
|---|---|---|
| DE | 102015107367 A1 | 11/2016 |
| WO | 2019148024 A1 | 8/2019 |

OTHER PUBLICATIONS

International Search Report and Written Opinion for PCT Application No. PCT/US2020/070770, mailed on Feb. 5, 2021, 15 pages.
Bernet, et al., "Quantitative Imaging of Complex Samples By Spiral Phase Contrast Microscopy", Optics Express, OSA Publishing, US, vol. 14, No. 9, May 1, 2006, pp. 3792-3805.
Hoffmann, et al., "Kilohertz Binary Phase Modulator for Pulsed Laser Cources Using a Digital Micromirror Device", arXiv:1710.06936v2 [physics.ins-det], Jan. 8, 2018, 8 pages.
Antipa, et al., "DiffuserCam: lensless single-exposure 3D imaging", Optica, vol. 5, No. 1, Jan. 2018, pp. 1-9.
Botcherby, et al., "Scanning two photon fluorescence microscopy with extended depth of field", Optics Communications 268, 2006, pp. 253-260.
Brainard, "The Psychophysics Toolbox", Spatial Vision, 10, 1997, pp. 433-436.
Brown, et al., "Independent component analysis at the neural cocktail party", Trends in Neurosciences, vol. 24, No. 1, Jan. 2001, pp. 54-63.
Broxton, et al., "Wave optics theory and 3-D deconvolution for the light field microscope", Optics Express, vol. 21, No. 21, Oct. 21, 2013, pp. 25418-25439.
Bullen, et al., "High-speed, random-access fluorescence microscopy: I. High-resolution optical recording with voltage-sensitive dyes and ion indicators", Biophysical Journal, vol. 73, Jul. 1997, pp. 477-491.
Buzsáki, et al., "Scaling Brain Size, Keeping Timing: Evolutionary Preservation of Brain Rhythms", Neuron, 80(3), Oct. 30, 2013, pp. 751-764.
Candès, "The Restricted Isometry Property and its Implications for Compressed Sensing", C. R. Acad. Sci. Paris, Ser. I 346, 2008, pp. 589-592.
Chen, et al., "Functional mapping of single spines in cortical neurons in vivo", Nature, vol. 475, Jul. 28, 2011, pp. 501-505.
Chen, et al., "Prior image constrained compressed sensing (PICCS): A method to accurately reconstruct dynamic CT images from highly undersampled projection data sets", Med. Phys., 35(2), Feb. 2008, pp. 660-663.
Chen, et al., "Ultra-sensitive fluorescent proteins for imaging neuronal activity", Nature, 499(7458), Jul. 18, 2013, pp. 295-300.
Cohen, et al., "Attention improves performance primarily by reducing interneuronal correlations", Nat. Neurosci., 12(12), Dec. 2009, pp. 1594-1600.

Constantinople, et al., "Effects and Mechanisms of Wakefulness on Local Cortical Networks", Neuron, 69(6), Mar. 24, 2011, pp. 1061-1068.
Dana, et al., "Sensitive red protein calcium indicators for imaging neural activity", eLife 5, e12727, 2016, 24 pages.
Field, et al., "Superresolved multiphoton microscopy with spatial frequency-modulated imaging", PNAS, vol. 113, No. 24, Jun. 14, 2016, pp. 6605-6610.
Friedrich, et al., "Fast online deconvolution of calcium imaging data", PLOS Computational Biology, Mar. 14, 2017, 26 pages.
Gray, "Electron Microscopy of Synaptic Contacts on Dendrite Spines of the Cerebral Cortex", Nature, vol. 183, Jun. 6, 1959, pp. 1592-1593.
Gustafsson, "Extended resolution fluorescence microscopy", Current Opinion in Structural Biology, vol. 9, Issue 5, Oct. 1999, pp. 627-634.
Harris, et al., "Cortical state and attention", Nat. Rev. Neurosci., 12(9), 2011, pp. 509-523.
Jensen, et al., "Multiplex imaging of quantal glutamate release and presynaptic Ca2+ at multiple synapses in situ", Nature Communications, 10(1414), 2019, 29 pages.
Kazemipour, et al., "Multiplicative Updates for Optimization Problems with Dynamics", Asilomar Conference on Signals, Systems, and Computers, 2017, 5 pages.
Laissue, et al., "Assessing phototoxicity in live fluorescence imaging", Nature Methods, vol. 14, No. 7, Jul. 2017, pp. 657-661.
Lu, et al., "Video-rate volumetric functional imaging of the brain at synaptic resolution", Nat. Neurosci., 20(4), Apr. 2017, pp. 620-628.
Lucy, "An iterative technique for the rectification of observed distributions", The Astronomical Journal, vol. 79, No. 6, Jun. 1974, pp. 745-754.
Luczak, et al., "Gating of Sensory Input by Spontaneous Cortical Activity", The Journal of Neuroscience, 33(4), Jan. 23, 2013, pp. 1684-1695.
Lustig, et al., "Sparse MRI: The application of compressed sensing for rapid MR imaging", Magnetic Resonance in Medicine 58, 2007, pp. 1182-1195.
Mainen, et al., "Synaptic calcium transients in single spines indicate that NMDA receptors are not saturated", Nature, vol. 399, May 13, 1999, pp. 151-155.
Mayer, et al., "Voltage-dependent block by Mg2+ of NMDA responses in spinal cord neurones", Nature, vol. 309, May 17, 1984, pp. 261-263.
Neil, et al., "Method of obtaining optical sectioning by using structured light in a conventional microscope", Optics etters, vol. 22, No. 24, Dec. 15, 1997, pp. 1905-1907.
Okun, et al., "Population Rate Dynamics and Multineuron Firing Patterns in Sensory Cortex", The Journal of Neuroscience, 32(48), Nov. 28, 2012, pp. 17108-17119.
Park, et al., "Enhanced Axial Resolution of Wide-Field Two-Photon Excitation Microscopy by Line Scanning Using a Digital Micromirror Device", Micromachines, vol. 8, No. 85, 2017, 9 pages.
Pégard, et al., "Compressive light-field microscopy for 3D neural activity recording", Optica, vol. 3, No. 5, May 2016, pp. 517-524.
Peterka, "Imaging voltage in neurons", Neuron, 69(1), Jan. 13, 2011, pp. 9-21.
Pneumatikakis, et al., "Simultaneous Denoising, Deconvolution, and Demixing of Calcium Imaging Data", Neuron 89, 2016, pp. 285-299.
Podgorski, et al., "Brain heating induced by near infrared lasers during multiphoton microscopy", J Neurophysiol 116, 2016, pp. 1012-1023.
Podgorski, et al., "Fast non-negative temporal deconvolution for laser scanning microscopy", Journal of Biophotonics, vol. 6, No. 2, Feb. 2013, pp. 153-162.
Preibisch, et al., "Efficient Bayesian-based multiview deconvolution", Nat. Methods, 11(6), Jun. 2014, pp. 645-648.
Prevedel, et al., "Fast volumetric calcium imaging across multiple cortical layers using sculpted light", Nat. Methods 13(12), Dec. 2016, pp. 1021-1028.

(56) References Cited

OTHER PUBLICATIONS

Prevedel, et al., "Simultaneous whole-animal 3D imaging of neuronal activity using light-field microscopy", Nat. Methods, 11(7), Jul. 2014, pp. 727-730.
Richardson, "Bayesian-Based Iterative Method of Image Restoration", JOSA, vol. 62, No. 1, Jan. 1972, pp. 55-59.
Sakoe, et al., "Dynamic programming algorithm optimization for spoken word recognition", IEEE Trans. Acoust. Speech Signal Process., vol. ASSP-26, No. 1, Feb. 1978, pp. 43-49.
Schuett, et al., "Mapping Retinotopic Structure in Mouse Visual Cortex with Optical Imaging", The Journal of Neuroscience, 22(15), Aug. 1, 2002, pp. 6549-6559.
Sofroniew, "A large field of view two-photon mesoscope with subcellular resolution for in vivo imaging", eLife 5, e14472, 2016, 20 pages.
Sommer, et al., "Ilastik: Interactive learning and segmentation toolkit", 2011 IEEE International Symposium on Biomedical Imaging: From Nano to Macro, Jan. 24, 2011, pp. 230-233.
Song, et al., "Volumetric Two-photon Imaging of Neurons Using Stereoscopy (vTwINS)", Nat. Methods, 14(4), Apr. 2017, pp. 420-426.
Stringer, et al., "Spontaneous behaviors drive multidimensional, brain-wide activity", Science, vol. 364, No. 6437, Apr. 2019, 27 pages.
Szalay, et al., "Fast 3D Imaging of Spine, Dendritic, and Neuronal Assemblies in Behaving Animals", Neuron 92, Nov. 23, 2016, pp. 723-738.
Tan, et al., "Orientation Selectivity of Synaptic Input to Neurons in Mouse and Cat Primary Visual Cortex", The Journal of Neuroscience, 31(34), Aug. 24, 2011, pp. 12339-12350.
Theriault, et al., "Extended two-photon microscopy in live samples with Bessel beams: steadier focus, faster volume scans, and simpler stereoscopic imaging", Frontiers in Cellular Neuroscience, vol. 8, Article 139, May 2014, 11 pages.
Von Diezmann, et al., "Three-Dimensional Localization of Single Molecules for Super-Resolution Imaging and Single-Particle Tracking", Chem. Rev., 117(11), Jun. 2017, pp. 7244-7275.
White, "Image restoration using the damped Richardson-Lucy Method", Astronomical Data Analysis Software and Systems III, ASP Conference Series, vol. 61, 1994, pp. 292-295.
Wu, et al., "Kilohertz in vivo imaging of neural activity", bioRxiv 543058, 2019, 21 pages.
Xie, et al., "Resolution of High-Frequency Mesoscale Intracortical Maps Using the Genetically Encoded Glutamate Sensor iGluSnFR", The Journal of Neuroscience, 36(4), Jan. 27, 2016, pp. 1261-1272.
Yamamoto, et al., "Successful Execution of Working Memory Linked to Synchronized High-Frequency Gamma Oscillations", Cell 157, May 8, 2014, pp. 845-857.
Yang, et al., "In vivo imaging of neural activity", Nat. Methods, 14(4), 2017, pp. 349-359.
Yang, et al., "Simultaneous Multi-plane Imaging of Neural Circuits", Neuron, 89(2), Jan. 20, 2016, pp. 269-284.
Zucca, et al., "An inhibitory gate for state transition in cortex", eLife, e26177, May 2017, 31 pages.

RANDOM ACCESS PROJECTION MICROSCOPY

CROSS-REFERENCE TO RELATED APPLICATIONS

This application is a 35 U.S.C. § 371 National Phase Entry Application from PCT/US2020/070770, filed on Nov. 11, 2020, entitled "RANDOM ACCESS PROJECTION MICROSCOPY", which claims the benefit of U.S. Provisional Application No. 62/933,804, filed on Nov. 11, 2019, entitled "SCANNED LINE ANGULAR PROJECTION MICROSCOPY," the disclosures of which is are incorporated herein by reference in their entirety.

BACKGROUND

The study of biological samples, including the study of brain function, relies on measurement tools that achieve high spatial resolution over large volumes at high rates. Biological samples are often opaque, meaning that optical tools for studying intact tissues at high resolution must be insensitive to light absorption and scattering.

Multi-photon imaging can achieve this insensitivity by using nonlinear absorption, because it confines excitation to the focus of a laser beam, is insensitive to scattering, and can use red-shifted excitation wavelengths relative to linear absorption. Applications of multiphoton excitation or absorption include imaging, optogenetics, photostimulation, laser machining, photochemistry, lithography, and additive manufacturing. Imaging applications described here may include two-photon imaging, three-photon imaging, and/or excitation of molecules with optically addressable state transitions.

In multiphoton imaging, all emitted fluorescence can be assigned to the focus of the excitation beam regardless of scattering, without forming an optical image. Instead, an image is produced by scanning the focus in space across one or more regions of interest. However, this serial approach to image acquisition creates a tradeoff between achievable frame rates and pixel counts per frame. Common fluorophores have fluorescence lifetimes of approximately 3 ns, and brighter fluorophores tend to have longer lifetimes due to the association between fluorescence quantum yield and fluorescence lifetime. The fluorescence lifetime determines the probability of crosstalk between successive measurements acquired at a given rate, limiting the bandwidth of measurements. For imaging applications with a fluorescence lifetime of 3 ns, approximately 10 ns must pass between consecutive measurements to achieve acceptably low rates of crosstalk.

Many applications, such as fluorescence imaging within scattering samples, require creating a sequence of excitation patterns at different locations in the sample ('sequential condition'). For example, in raster imaging, each pixel of an image is exposed sequentially by scanning of the laser focus, and images are reconstructed from the resulting time-domain signal. If pixels were exposed simultaneously, crosstalk of scattered emission light would mix different pixels together in the image, degrading image resolution. Therefore, the maximum achievable framerate for a 1-megapixel field of view (FOV) under raster-scanning fluorescence imaging is approximately 100 Hz. In practice, pixel rates have been further limited by factors such as photodamage, fluorophore saturation, and scanner technology.

The consequences of the aforementioned pixel rate limit for raster imaging can be mitigated by more efficient sampling techniques. In many activity imaging paradigms, a dense pixel-based representation of the sample is recorded and then reduced to a lower-dimensional space, e.g., by selecting particular regions of interest from the recorded representation. By sampling this low-dimensional representation more directly, the equivalent result can be obtained with fewer measurements. Several methods have previously been developed that can record from sample volumes using fewer measurements than raster scanning.

For example, random access imaging using acousto-optic deflectors enables sampling of a subset of points in the sampling region, with a fixed access time required to move the excitation focus between points. If the desired points are sparse enough in space, the time saved by not sampling the intervening area when moving the focused light from one region of interest to another significantly outweighs the access time costs. However, if the desired points are not sufficiently sparse in space, random access imaging offers little improvement in scanning time.

Thus, new techniques for fast random-access microscopy are needed.

SUMMARY

In a general aspect, a method of imaging a sample providing light from a light source, directing the provided light into an extended focus of light, scanning the extended focus of light across a wavefront modulating element that modulates amplitudes of segments of the extended focus, providing the modulated light to the sample, detecting light emitted from the sample in response to excitation by the modulated light, and generating an image of the sample based on the detected light.

In another general aspect, a system for imaging a sample includes a light source configured for providing a light beam, at least one focusing optical element configured for providing an extended focus of the light beam, at least one a wavefront modulating element configured for modulating amplitudes of segments of the extended focus of the light beam, at least one scanning optical element configured for scanning the extended focus across a the wavefront modulating element, an objective configured for providing the modulated extended focus of light to the sample, at least one detector configured for detecting light emitted from the sample in response to excitation by the modulated light, and at least one processor configured for generating an image of the sample based on the detected light.

Implementations can include one or more of the following features, alone or in any combination with each other.

For example, the wavefront modulating element can include a DMD.

Scanning the extended focus across the DMD can includes scanning the extended focus across a first field of view of the DMD, imaging the light scanned light onto a mirror, and scanning the light imaged onto the mirror across a second field of view of the DMD.

The modulated light provided to the sample can be provided to the sample to form a line focus in the sample.

A width of the line of light can be specified by a resolution limit of an objective lens through which the line of light is provided to the sample.

Scanning the extended focus across the wavefront modulating element can include repeatedly scanning the extended focus across the wavefront modulating element at a rate of greater than 10 kHz and can include a pattern on the wavefront modulating element can be updated, where the pattern on the wavefront modulating element modulates the amplitude of the extended focus, where the updating occurs at a rate of greater than 10 kHz between scans of the extended focus across the wavefront modulating element.

The generating of the image of the sample can include generating the image based on a plurality of images of the sample corresponding different patterns on the wavefront modulating element when the extended focus is scanned across the wavefront modulating element.

The generated image can be a two-dimensional image.

The generated image can be a three-dimensional image.

The detected light emitted from the sample in response to excitation by the modulated light can be emitted in response to a two-photon excitation process.

The extended focus can be scanned across a first wavefront modulating element having a first pattern of ON and OFF pixels, which modulates amplitudes of the light along the extended focus. The modulated light can be provided by the first wavefront modulating element to the sample. The extended focus can be scanned across a first wavefront modulating element having a second pattern of ON and OFF pixels, which modulates amplitudes of the light along the extended focus. The second pattern can be updated while providing the modulated light by the first wavefront modulating element to the sample. The first pattern can be updated while providing the modulated light by the second wavefront modulating element to the sample. Light emitted from the sample in response to excitation by the light modulated by the first and second wavefront modulating elements can be detected. And an image of the sample can be generated based on the detected fluorescence emission light.

Generating the image of the sample can include generating, based on the detected fluorescence emission light, a plurality of images of the sample corresponding to different time points, determining whether each of a plurality of emitters in the images of the sample are active or non-active at the different time points.

DETAILED DESCRIPTION

Figure 1A:
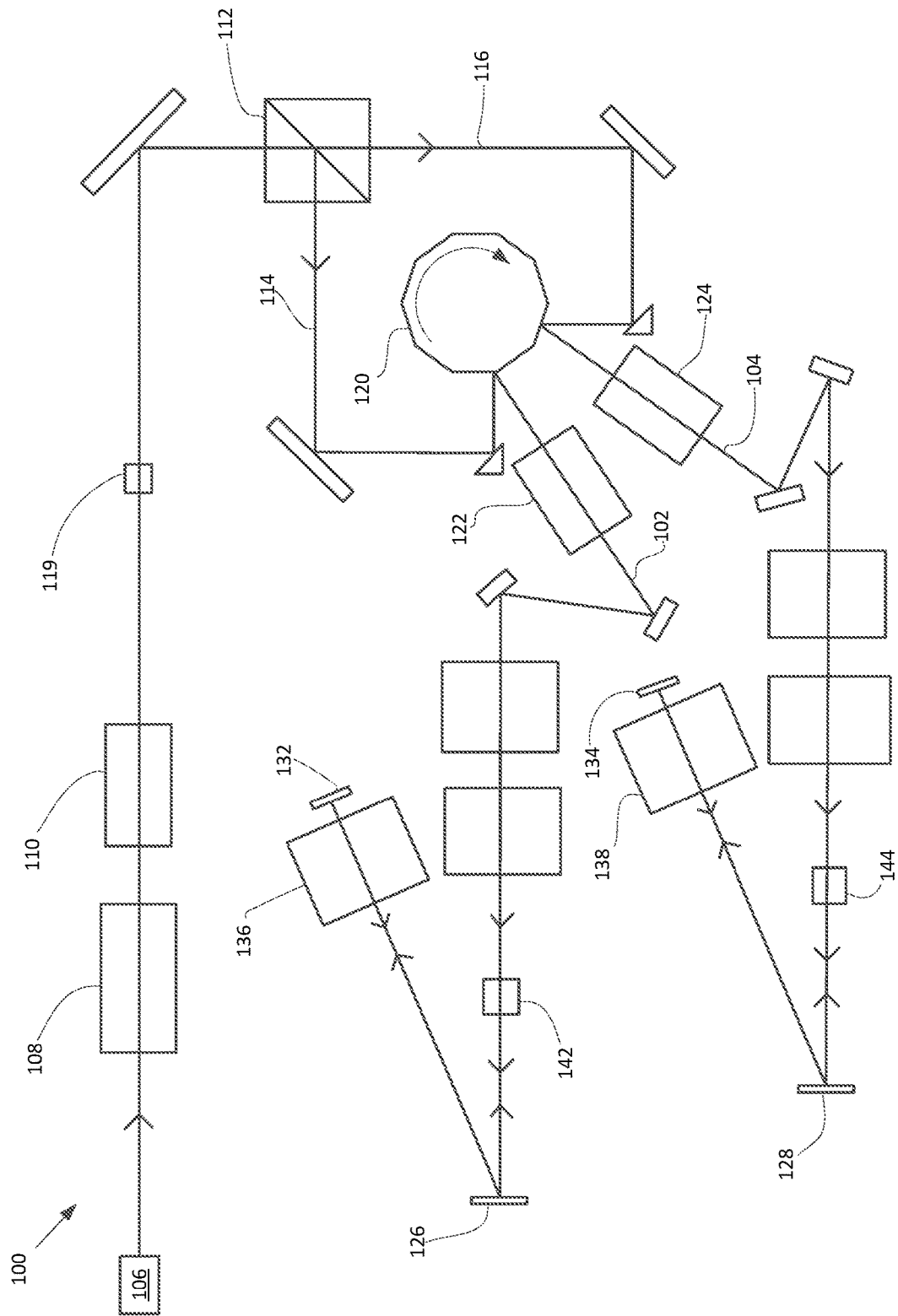
FIGS. 1A and 1B provide a schematic diagram of a fast random access line-scanning microscope system.

Important performance parameters for multiphoton illumination systems include: access time, i.e., the rate at which a focus pattern of the excitation light can be changed, or moved from one location to another; and addressability, i.e., the degree of dynamic control over the focal pattern of the excitation light.

The minimum access time of mechanical scanners when steering a focused beam is relatively short. For example, a focus can be shifted from one point to another non-overlapping point in nanoseconds by a fast-moving scanner. However, the addressability of mechanical scanners is extremely poor over these timescales, because only nearby points are accessible.

In contrast, the access time of spatial light modulators (SLMs) is relatively long. For example, liquid-crystal-on-silicon SLMs require multiple milliseconds to update their state, and digital micromirror devices (DMDs) require tens of microseconds. However, the addressability of SLMs is relatively high, since any combinatorial pattern placed over the SLM pixels can be achieved within a single access time.

To overcome this limitation, techniques are described herein that combine a mechanical scanner and wavefront modulating element to achieve the minimum access time of the scanner and the addressability of the wavefront modulating element, for acquiring two-photon images of a sample with frame acquisition rates exceeding 1000 Hz for fields of view greater than 1 million pixels in each frame. In the described techniques, a spatially-resolved wavefront modulating element modulates an amplitude and/or phase of and extended focus (e.g., a line) of excitation light as the extended focus is scanned across the sample, such that the modulated extended focus excites a programmed region of interest in the sample for each different location of the scanned extended focus, so that for the different locations, light is emitted from the sample for detection from only the programmed region. The emitted light is detected, and the detected light signal received at a given time can be assigned to the particular region(s) of interest in the sample that is/are excited by the modulated extended focus at that time. Line foci can be used for the extended focus because they are relatively simple to produce optically, efficiently sample a compact area by scanning, can achieve diffraction-limited spatial resolution, and produce two-photon excitation more efficiently than non-contiguous foci of the same area. In some implementations, the line focus can be a straight line. In some implementations, the line focus can be a non-straight line. While line foci of excitation light are described herein other geometries resulting in other fluorescence intensity projections of the sample are also possible. The modulated line of light is scanned multiple times across the sample, and different modulation patterns are applied during different scans, so that all regions of interest of the sample are excited. The detected light collected from all the regions of interest is processed to generate an image of the sample. A plurality of wavefront modulating elements can be used, each modulating a different line of light that is scanned across the sample, so that the sample can be scanned with one line of light modulated by a first element, while the modulation pattern on a second element is being updated between scans of light that is modulated by the second element, and the sample can be scanned with another line of light modulated by the second element, while the modulation pattern on the first element is being updated between scans of light that is modulated by the first element.

Masking the excitation pattern with an amplitude-modulating wavefront modulating element enables random access imaging of programmable spatial patterns within a focal plane. The minimum number of measurements required to sample all regions of interest independently depends on the number and arrangement of regions of interest.

In addition, the microscope can scan different excitation light beams across the focal plane of the microscope at a plurality of different orientations to obtain linear projections of the sample, which can be used to generate tomographic images of the sample. For example, a plurality of excitation line foci can be used to obtain the projections. In this configuration, non-independent information can be recorded from all sample regions at a framerate that does not depend on the number and arrangement of regions of interest.

These techniques each enable framerates up to the line scan rate, in excess of 15,000 Hz. With these techniques, dynamic activity of the sample can be recovered from arbitrary numbers of regions of interests across the entire field of view at resolutions up to the diffraction limit. The techniques can also be used to localize particles below the resolution limit of light microscopy and to track moving particles over time.

Unlike random access imaging with acousto-optic or electro-optic deflectors, this method does not entail a per-region access time, making it particularly effective compared to these other methods for recording from large numbers of regions of interest. The microscope implementing these techniques retains the high spatial resolution and insensitivity to scattering of conventional two-photon imaging but can achieve frame rates much higher than conventional raster scanning microscopes.

In particular, techniques are disclosed for producing illumination patterns with high addressability and low access time by using an amplitude-modulating wavefront modulating element (for example, a DMD) in combination with a scanner. Furthermore, an illumination geometry that compensates for pulse-front tilt and spectral dispersion introduced by DMDs in the light that is modulated by the DMDs is disclosed. In addition, constraints on DMD chips used for multiphoton imaging and methods to avoid nonlinear damage to the mirror surface of a DMD are disclosed, as well as techniques for using multiple DMDs illuminated by light provided by one or more scanners and one or more light sources to extend the field of view of the system and increase the scanning duty cycle to over 99%. Also described are methods to use one or more DMD scan units to sequentially excite regions of interest within a sample and methods to use these capabilities to generate digital images of a sample.

Figure 1B:
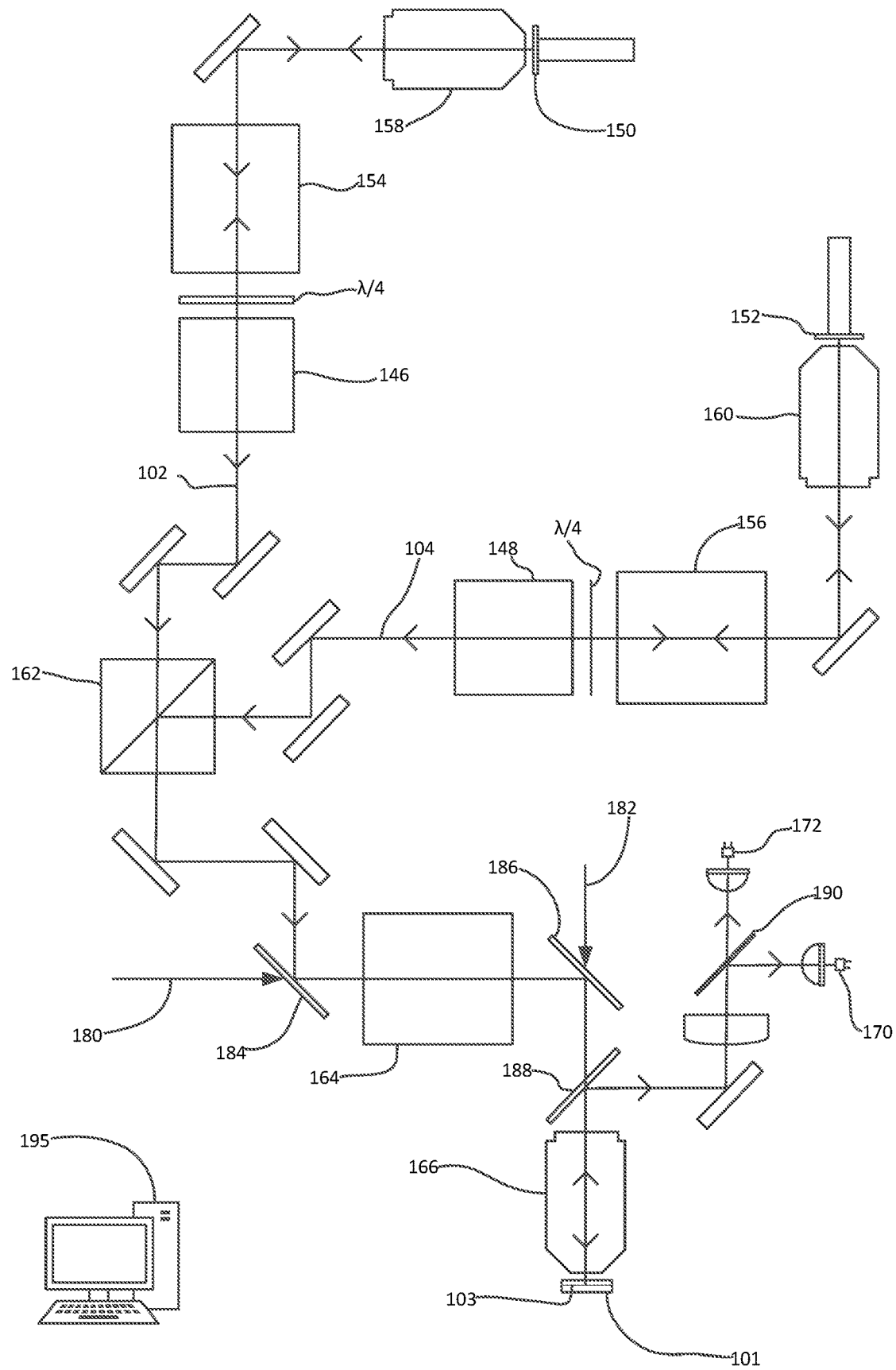

FIGS. 1A and 1B provide a schematic diagram of a microscope system 100 that can be used for implementing the techniques described herein to image a sample 101. The microscope system 100 can include two line scanning beams 102, 104. The line scan beams 102, 104 can originate from a single laser source 106 (e.g., a Yb:YAG laser that outputs 120 fs pulses of 1030 nm light with a repetition rate of 41 MHz and with average power of 50 W). The laser pulses can be expanded by a beam expander 108, and an electro-optic modulator (Pockels cell) 110 can be used to rapidly switch the beam between two paths by rotating the polarization of the beam prior to the beam passing through a polarizing beam splitter (PBS) 112 that diverts the beam into one of two output paths 114, 116 depending on the polarization of the beam that enters the PBS 112.

Light pulses emitted from the light source 106 can be shaped into an extended focus of light in the sample 101 by imparting a one-dimensional angular range on an incoming, collimated laser beam having a two-dimensional Gaussian (or similarly peaked) spatial intensity distribution. In some implementations, when the incoming beam is focused by an objective 166, it makes can make a line focus in the sample 101. In some implementations, the extended focus can have a substantially uniform intensity distribution along an axis the extended focus. In some implementations, the extended focus can have diffraction-limited width in the focused dimension transverse to an axial length of the extended focus. In some implementations, the extended focus can have an intensity distribution along an axis of the extended focus that is relatively uniform along a length of the axis of the extended focus and that is tightly focused in a direction transverse to the axis. For example, a length (e.g., a full-width, half-maximum (FWHM)) of the intensity distribution along an axis of the extended focus can be N times greater than a transverse width (e.g., a FWHM) of the intensity distribution direction transverse to the axis, where N is, for example, at least 30, at least 100, at least 200, or at least 400. In an implementation, a single acylindrical lens 119 can shape the laser beam into a line of focused excitation light by redistributing a Gaussian input beam into a uniform line. In some implementations, other structures and techniques can be used to for generating the extended focus. For example, a spatial light modulator, an axicon, etc. can modify an input beam into a line of light.

Each path beam path 114, 116 that follows the beam splitter 112 can deliver a focused line of light to a scanner 120 (e.g., a rotating polygonal mirror) that can be used to scan both beams 102, 104. The beams 102, 104 can be scanned by the rotating polygonal mirror 120 by reflecting the beams in each path 114, 116 at different locations on the rotating mirror of the polygon scanner. Downstream from the scanner 120, the scanned beams 102, 104, can be focused by respective scan lenses 122, 124 and the resulting images conjugated to respective wavefront modulating elements 126, 128 that modulate an amplitude of different segments of the lines of light, as explained in more detail herein. In some implementations, the scanned lines of light 102, 104 are delivered to their respective wavefront modulating elements 126, 128, then reflected off respective mirrors 132, 134 that are conjugated to their respective wavefront modulating elements 126, 128 by a respective lens 136, 138, and then reflected again by the wavefront modulating elements 126, 128 (as explained in more detail herein) before being reflected by a polarization-sensitive beam splitter 142, 144 and directed further toward the sample 101. For example, the polarization-sensitive beam splitters 142, 144 shown in FIG. 1A can direct the modulated lines of light to the optical elements shown in FIG. 1B, which further processed the light before imaging the light onto the sample 101.

As shown in FIG. 1B, the lines of excitation light that have been modulated by the wavefront modulating elements 126, 128 can be directed (e.g., by beam splitters 146, 148) through tube lenses 154, 156 and objective lenses 158, 160 to respective movable mirrors 150, 152 that can be moved along an axis of the beam (e.g., by a piezoelectric device) to change a focal plane 103 of each beam within the sample 101. Then, modulated lines of excitation light received from the mirrors 150, 152 can be directed into a common beam path by a polarization-sensitive beam splitter 162 (where the polarization of beam 102 is controlled such that the beam is transmitted by the beam splitter 162 and the polarization of beam 104 is controlled such that the beam is reflected by the beam splitter 162) and then imaged onto a focal plane 103 within the sample 101 by a tube lens 164 and an objective lens 166.

Light emitted from the sample 101 in response to the modulated lines of excitation light can be collected by the objective lens 166 and imaged onto a first detector 170. A first auxiliary beam of excitation light 180 (e.g., having a wavelength in the near infrared spectrum) can be imaged onto the sample 101 at a focal plane 103 independent of the primary beams 102, 104, and light emitted from the sample 101 in response to the first auxiliary beam can be collected by the objective 166 and imaged onto a second detector 172. A second auxiliary beam of excitation light 182 (e.g., having a wavelength in the visible spectrum) can be imaged onto the sample 101, and light emitted from the sample 101 in response to the second auxiliary beam can be collected by the objective 166 and imaged onto a second detector 172. The auxiliary beams of excitation light 180, 182 can be coupled into the objective 166 by way of dichroic mirrors 184, 186 that transmit the auxiliary beams but that reflect the light received from the mirrors 150, 152. Emission light received from the sample 101 in response to excitation by light provided from the light source 106 or auxiliary light sources 180, 182 can be directed to the detectors 170, 172 by a dichroic mirror 188 that reflects the wavelength of the emission light but that transmits light from light sources 106, 180, 182, and another dichroic mirror 190 can route different wavelengths of emission light to the different detectors 170, 172. Operation of the elements of the system 100 of FIG. 1A, 1B can be controller by a controller 195, for example, one or more computing devices that include processors operable to executing machine-readable instructions for cause the elements of FIG. 1A, 1B to perform the techniques described herein.

Figures 2A, 2B:
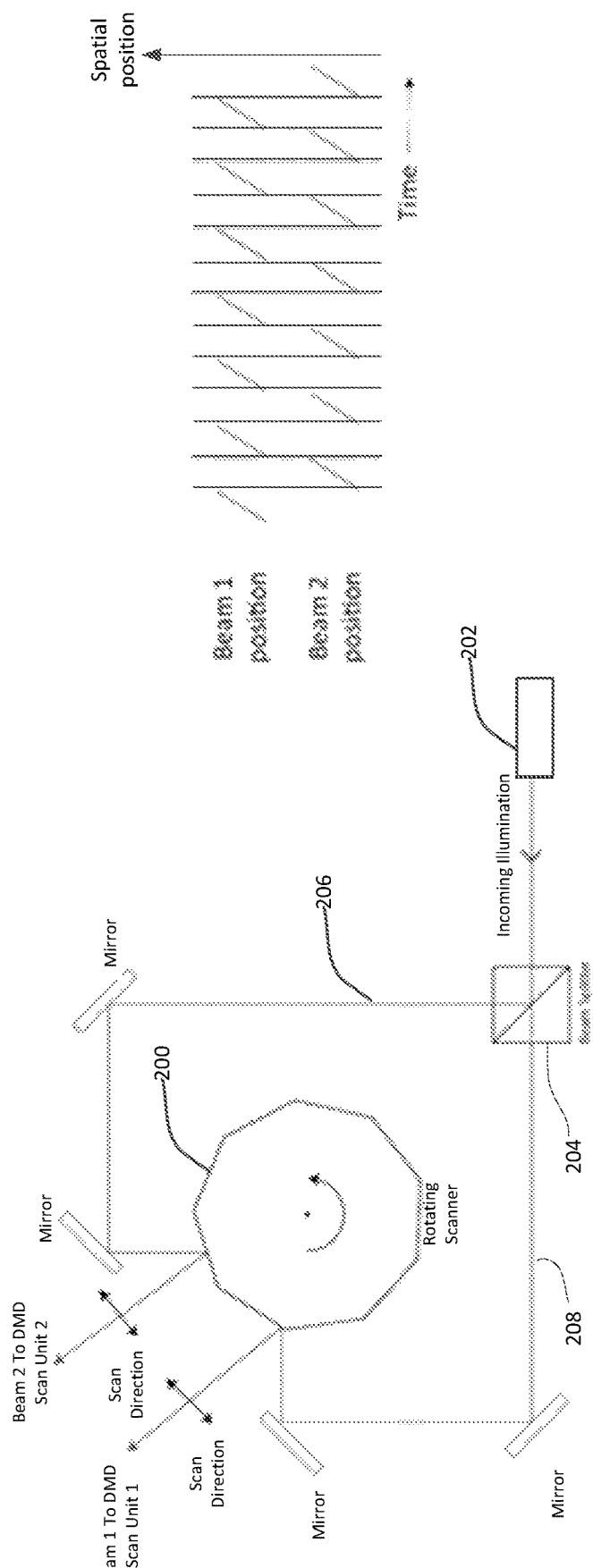
FIG. 2A is a schematic diagram of a single rotating scanner of the microscope system of FIG. 1A, 1B, which is used to scan light provided by a single light source across multiple DMDs with a defined relative phase between the light provided to the different DMDs.
FIG. 2B is a schematic graph of a position of each beam on its respective DMD as a function of time as the beam is scanned by the rotating scanner of FIG. 2A FIG. 3 a schematic diagram of a wavefront modulating element over which an extended focus (e.g., a line) of excitation light is scanned.

FIG. 2A is a detailed schematic view of the operation of a single rotating scanner 200 used to scan light provided by a single light source 202 across multiple DMDs with a defined relative phase between the light provided to the different DMDs. A light beam received from light source 202 can be split at a beam splitter 204 into one of two paths 206, 208. If a polarizing beam splitter is used, the beam may be directed into one or both paths 206, 208 by modulating its polarization of the beam that enters the beam splitter 204. A rotating polygonal mirror 200 can be used to scan multiple beams simultaneously or serially. Thus, the beams for all wavefront modulating elements (e.g., DMDs) can be scanned by the single polygon scanner 200, by reflecting the beams that are provided to each DMD unit at different locations on the rotating mirror of the polygon scanner 200. The relative phase of the scanned beams can be controlled by adjusting the location of each beam incident on the scanner, for example, to produce interleaved scans of high duty cycle, or to produce simultaneously scanned beams.

FIG. 2B is an example schematic graph of a position of two beams on their respective two DMDs as a function of time. The top row shows the position of a beam on a first DMD, and the bottom row shows the position of a beam on the second DMD. Diagonal lines in FIG. 2B indicate a beam being scanned across a surface of a DMD as a function of time, and vertical lines in FIG. 2B denote switching times between which a DMD unit is being scanned. The relative phase of each scanned beam depends on their relative locations on the polygonal scanner. In some implementations, the two beams are scanned perfectly interleaved (as shown in FIG. 2B), such that one beam strikes a vertex of the polygon scanner 200 at the same time the other beam is centered on a face of the polygon scanner 200.

Figure 3:
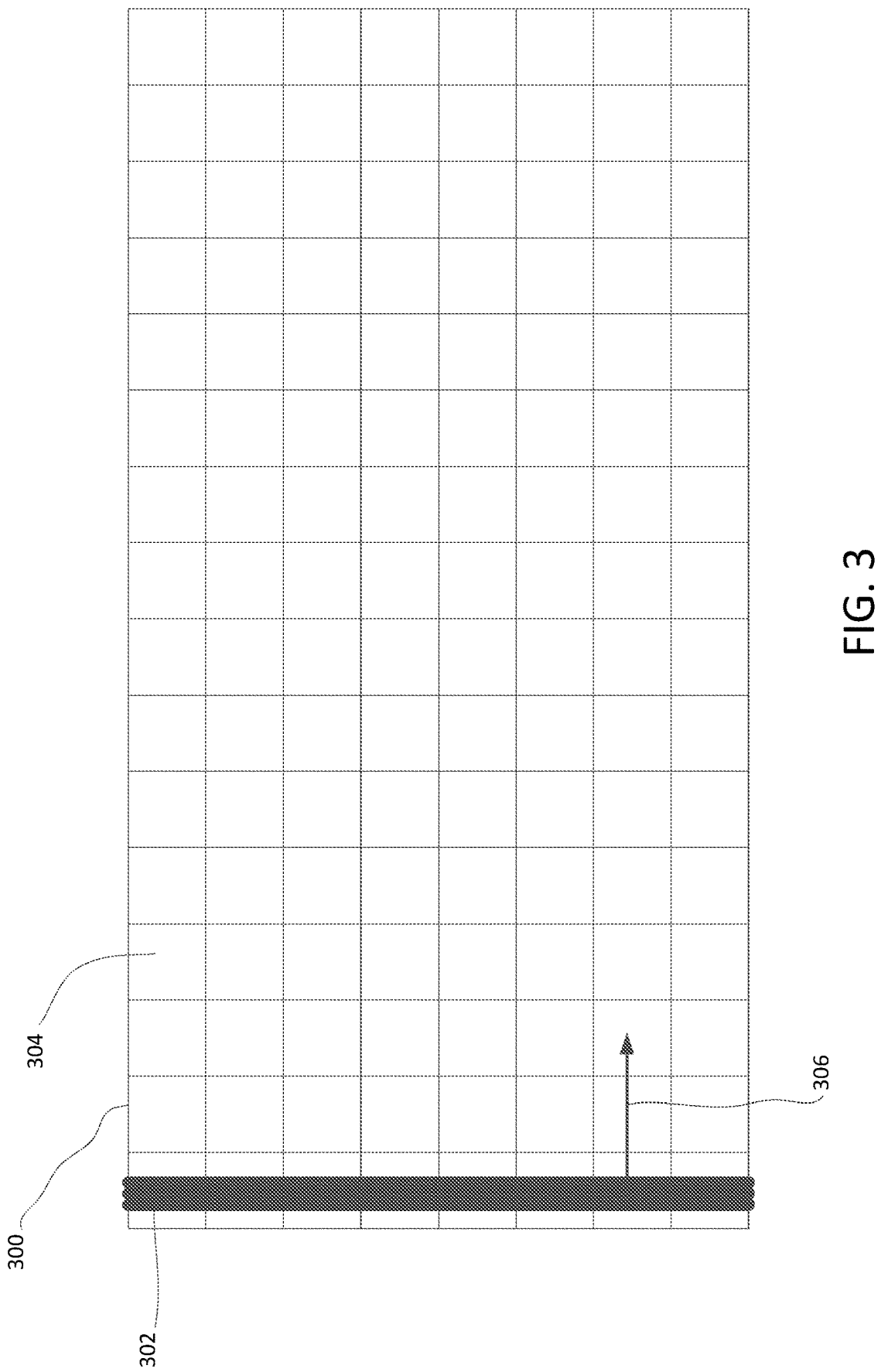

FIG. 3 is a schematic diagram of a wavefront modulating element (e.g., a DMD) 300 over which an extended focus (e.g., a line) of excitation light 302 can be scanned. The wavefront modulating element 300 can include a plurality of pixels (e.g., arranged in a grid) 304 that can modulate an amplitude of light that is reflected from the wavefront modulating element 300 to impart a modulated pattern to the reflected light. For example, each pixel 304 of the wavefront modulating element 300 can be individually programmed to direct light reflected from the pixel to either be directed to the rear pupil of the objective 166 (an "ON" state of the pixel) or not to be directed to the rear pupil of the objective (an "OFF" state of the pixel), such that the segments of the line focus in the sample 101 are individually modulated. In FIG. 3, an example geometry of an extended focus scanned across a DMD is shown in which line 302 denotes a line focus illuminating one or more columns of DMD pixels. The focus may be scanned in a direction 306 having a vector component that is perpendicular to the long axis of the line focus to illuminate an area of the DMD surface (the "Field of View") over time.

Scanning the extended focus 302 across an wavefront modulating element 300 allows short access times with high addressability, because scanning the extended focus changes the position of the focus on timescales of nanoseconds, and the wavefront modulating element 300 can provide for programmable spatial patterning of the focus as it is scanned across the wavefront modulating element 300. In this configuration, the wavefront modulating element 300 can be placed in the focal plane of a scanner (e.g., scanner 120), and an extended focus of light 302, which may have a uniform, Gaussian, or other intensity profile that extends for some or all of the height of the wavefront modulating element 300, can be scanned in a direction having a vector component perpendicular to the extent of the focus, resulting in a two-dimensional area of the wavefront modulating element 300 being illuminated over the course of the scan.

This configuration allows addressing any pattern of targets across the field of view of the wavefront modulating element 300 at a frame rate equal to the minimum of the rate at which the line of light can be scanned across the wavefront modulating element 300 and the wavefront modulating element 300 update rate. With currently available scanners and DMDs, these two rates are roughly equal, around 20 kHz, when a DMD is used as the wavefront modulating element 300. If the scanner's line scan rate is sufficiently high, the scanning of the line over the DMD, which can modulate portions (e.g., segments) of the scanned line, increases the pattern rate of a DMD-based illumination system without decreasing the frame rate, as compared to illumination of the entire DMD simultaneously by a light beam that fills the field of view of the DMD.

This technique of scanning a line focus of excitation light over a wavefront modulating element 300 surface that can modulate segments of the scanned line provides several advantages compared to illuminating the entire surface of an SLM simultaneously without scanning, as in digital holography systems. The access time of the SLM makes non-scanning systems thousands of times slower for 'sequential condition' applications than for scanning systems. For 'simultaneous condition' applications, the approach described here uses a lower degree of parallelization and therefore exhibits much higher power efficiency for a given laser pulse repetition rate and power. Due to nonlinearity of multiphoton absorption (proportional to (I)P, with p>1, where I represents the beam intensity), the degree of parallelization impacts power efficiency. Greater power efficiency is achieved by illuminating different locations in sequence rather than in parallel, i.e. by having a lower degree of parallelization. Illuminating multiple locations at the same time requires a linear proportional increase in power to retain the same power efficiency. Heat deposition, and therefore power efficiency, limits performance in many applications such as in vivo imaging and machining. In some cases, higher degrees of parallelization are desirable, for example, to integrate larger sample volumes or perform compressive sensing. The lower degree of parallelization of this technique also reduces constraints on axial resolution and laser speckle patterns imposed by illuminating an extended in-focus area with a coherent light source.

The systems described herein can be used for high speed imaging of a sample, for example, with two-photon excitation microscopy of fluorescently-labeled samples. The focal plane 103 of the imaging optical system can be defined as a planar or curved surface formed by the image of the field of view on the DMD that modulates the extended focus of excitation light, as relayed to the sample by an optical system, such as by a series of lenses. Measurements of the sample, corresponding to the intensities of sets of pixels in the focal plane, can be obtained by a light detector and can be performed using spatially-resolved or single-pixel detectors. One or more measurements may be obtained for each excitation laser pulse.

Sets of pixels simultaneously illuminated by the extended focus can be defined as "columns," and sets of pixels of the DMD oriented in the direction of scan as can be defined as "rows." Raster imaging of the focal plane by the extended focus excitation light can be performed by sequentially setting the DMD pattern of 'ON' pixels to each distinct row within the field of view of the DMD, while the pixels for other rows are set to 'OFF' and scanning the extended focus across the DMD to sequentially in time excite each portion of the sample corresponding to each pixel of the DMD. Light detected from excitation light provided from an individual pixel of the DMD can be assigned to a pixel of an image of the sample corresponding to the illuminated pixel of the DMD. In this case, each measurement is the intersection of a row and a column and corresponds to a single pixel of the image when the extended focus is a line focus. If one row is set 'ON' for each scanner cycle, a raster image can be obtained by each DMD unit in (scan rate)/(# rows) cycles. For example, using a 20 kHz scanner with a 20 kHz DMD update rate, images composed of 1000 rows can be obtained at a rate of 20 Hz for each DMD unit in the system. When two DMD are used to the provide excitation light to the sample independently, light can be provided from one DMD while the pattern of 'ON' pixels on the other DMD is updated, and then images of can be obtained at rate of 40 kHz.

Instead of, or in addition to, raster imaging, light provided from multiple pixels on the DMD can be combined into individual measurements. For example, regions of interest in a sample can be defined corresponding to sets of pixels that can be excited simultaneously ('Block ROIs'). For example, it may be desirable to excite a plurality of pixels simultaneously because they all belong to a single object to be measured, because they are sufficiently separated in space that they can be resolved using an imaging detector, or because the sample geometry ensures that they are never simultaneously of high intensity. Block ROIs may be defined by user selection or by an automated algorithm using prior image data of the sample. If a block ROI can be defined, pixels from multiple rows can be excited simultaneously by setting pixels from multiple rows of the DMD to 'ON' within a single column, thus speeding acquisition of the focal plane and/or increasing the amount of excitation performed per laser pulse.

A pattern of 'ON' pixels of the DMD can be defined such that no two block ROIs are excited simultaneously by a single laser pulse by setting only pixels belonging to a single ROI to 'ON' in each column. This results in statistically independent measurements of each ROI. In this case, images of the sample can be rapidly produced by algorithms that project each time-resolved measurement onto the set of pixels excited by the measurement. A planning algorithm can be used to define a sequence of ON/OFF pixel patterns for sequential DMD frames, which ensures independent measurements of each ROI, while sampling each column of each block ROI as uniformly as possible given a set of constraints, such as the number of frames to store in the DMD controller memory.

Figure 4A:
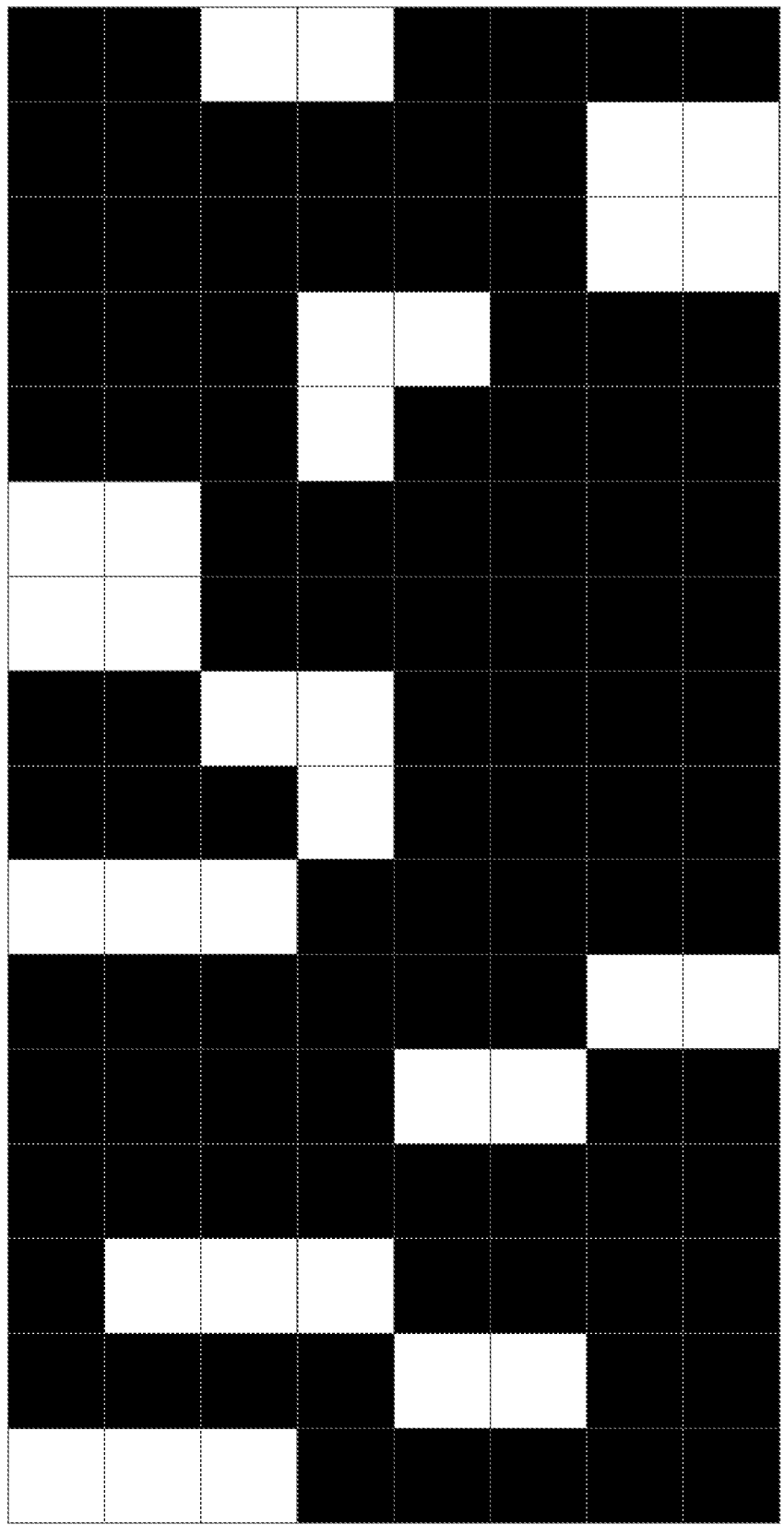
FIG. 4A is a schematic diagram of a first pattern on a DMD used for acquiring, over a first scan time, an image of first portions of a field of view of the microscope system of FIG. 1A, 1B.
Figure 4B:
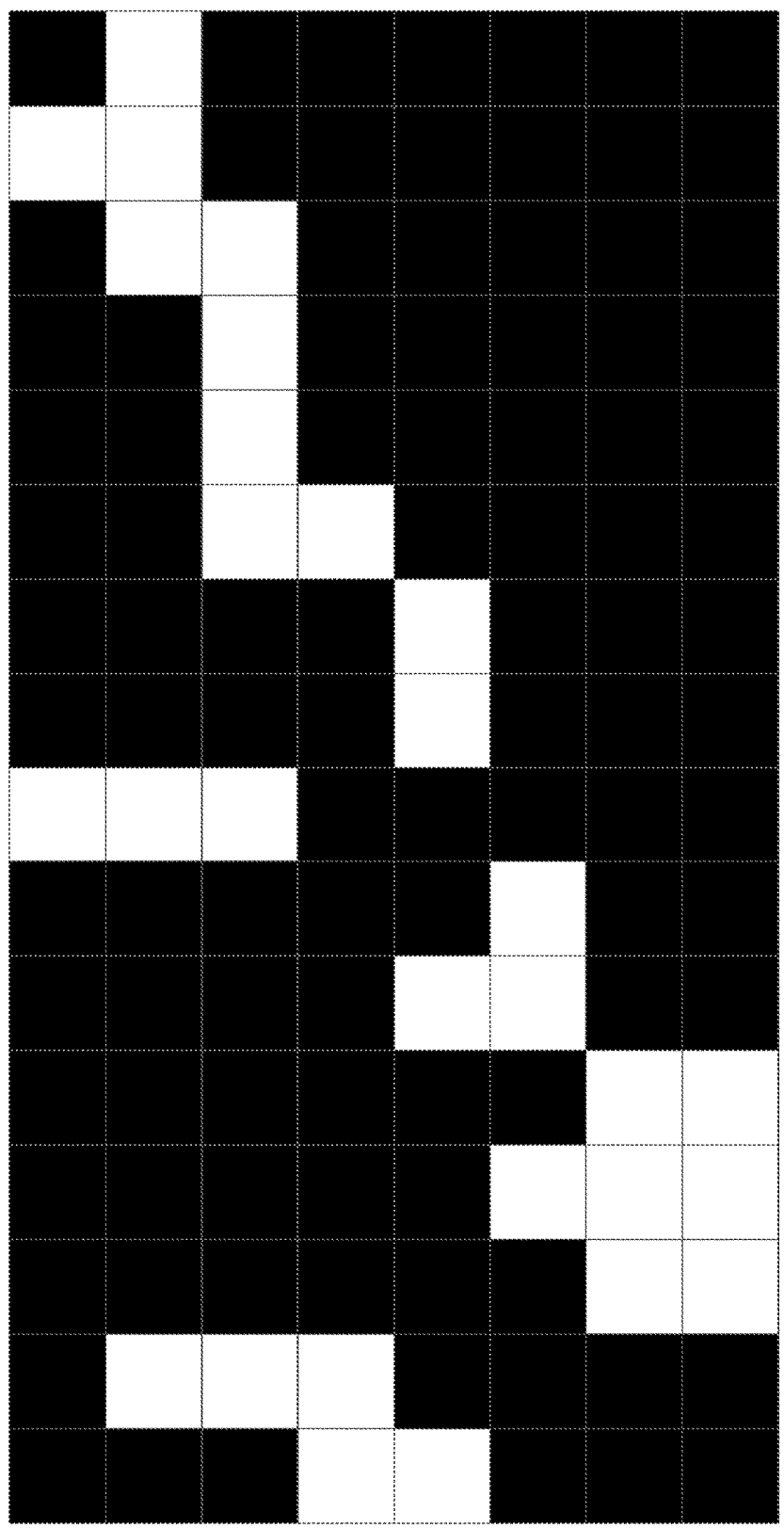
FIG. 4B is a schematic diagram of a second pattern on a DMD used for acquiring, over a second scan time, an image of second portions of a field of view of the microscope system of FIG. 1A, 1B.
Figure 4C:
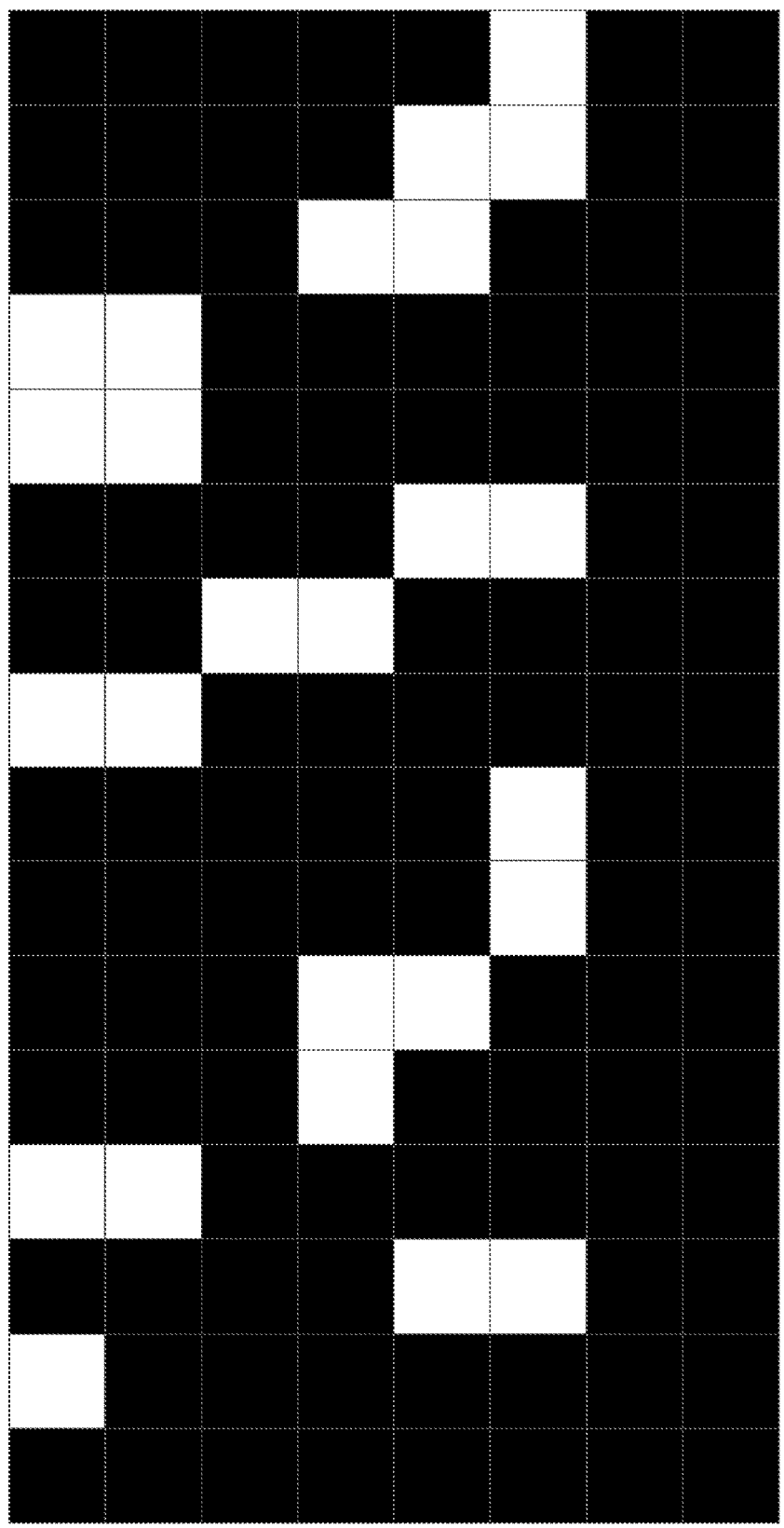
FIG. 4C is a schematic diagram of a third pattern on a DMD used for acquiring, over a third scan time, an image of third portions of a field of view of the microscope system of FIG. 1A, 1B.
Figure 4D:
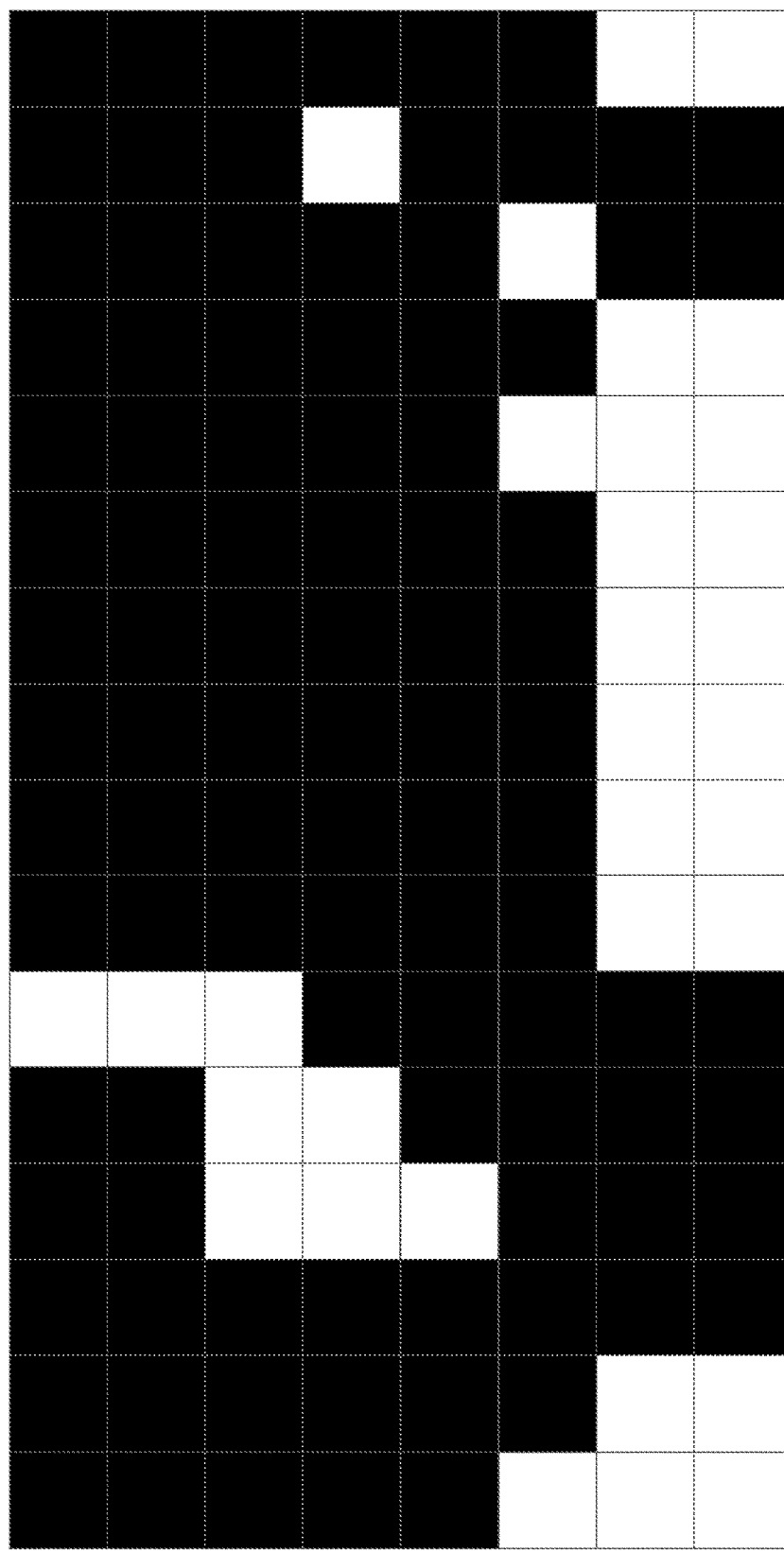
FIG. 4D is a schematic diagram of a fourth pattern on a DMD used for acquiring, over a fourth scan time, an image of fourth portions of a field of view of the microscope system of FIG. 1A, 1B.

FIGS. 4A, 4B, 4C, 4D are example schematic diagrams of a patterns of 'ON' pixels on a DMD 400 used for acquiring, over a first scan time, an image of first portions of a field of view of the microscope system of FIG. 1A, 1B. In FIGS. 4A, 4B, 4C, 4D, the white squares indicate 'ON' pixels on the DMD that direct light into the sample as a line of excitation light is scanned across the DMD, and the black squares indicate 'OFF' pixels on the DMD that do not direct light into the sample as a line of excitation light is scanned across the DMD. The patterns of FIGS. 4A, 4B, 4C, 4D can be provided on the DMD sequentially in time, so that excitation light corresponding to the pattern of 'ON' pixels of FIG. 4A is provided the sample when the line of excitation light is scanned across the DMD, with each column of a pattern being provided sequentially in time as the beam is scanned across the pattern on the DMD, then excitation light corresponding to the pattern of 'ON' pixels of FIG. 4B is provided the sample when the line of excitation light is scanned across the DMD, then excitation light corresponding to the pattern of 'ON' pixels of FIG. 4C is provided the sample when the line of excitation light is scanned across the DMD, and then excitation light corresponding to the pattern of 'ON' pixels of FIG. 4D is provided the sample when the line of excitation light is scanned across the DMD. The patterns of ON pixels on the DMD are updated between scans of the light across the DMD.

ON pixels in an individual column, in the patterns in FIGS. 4A, 4B, 4C, 4D correspond to distinct individual regions of interest that are excited simultaneously as the line of excitation light is scanned across the DMD. Only one region of interest is excited by light when a particular column of the DMD is provided with excitation light, but different regions of interested corresponding to the particular column can be excited by light provided to the DMD at different times. In this manner, a plurality of pixels within a region of interest can be excited simultaneously by appropriately defining ON pixels of the DMD, thus increasing the imaging rate of the sample as compared with point scanning techniques, while different regions of interest corresponding to a particular column can be resolved in time.

Figure 5:
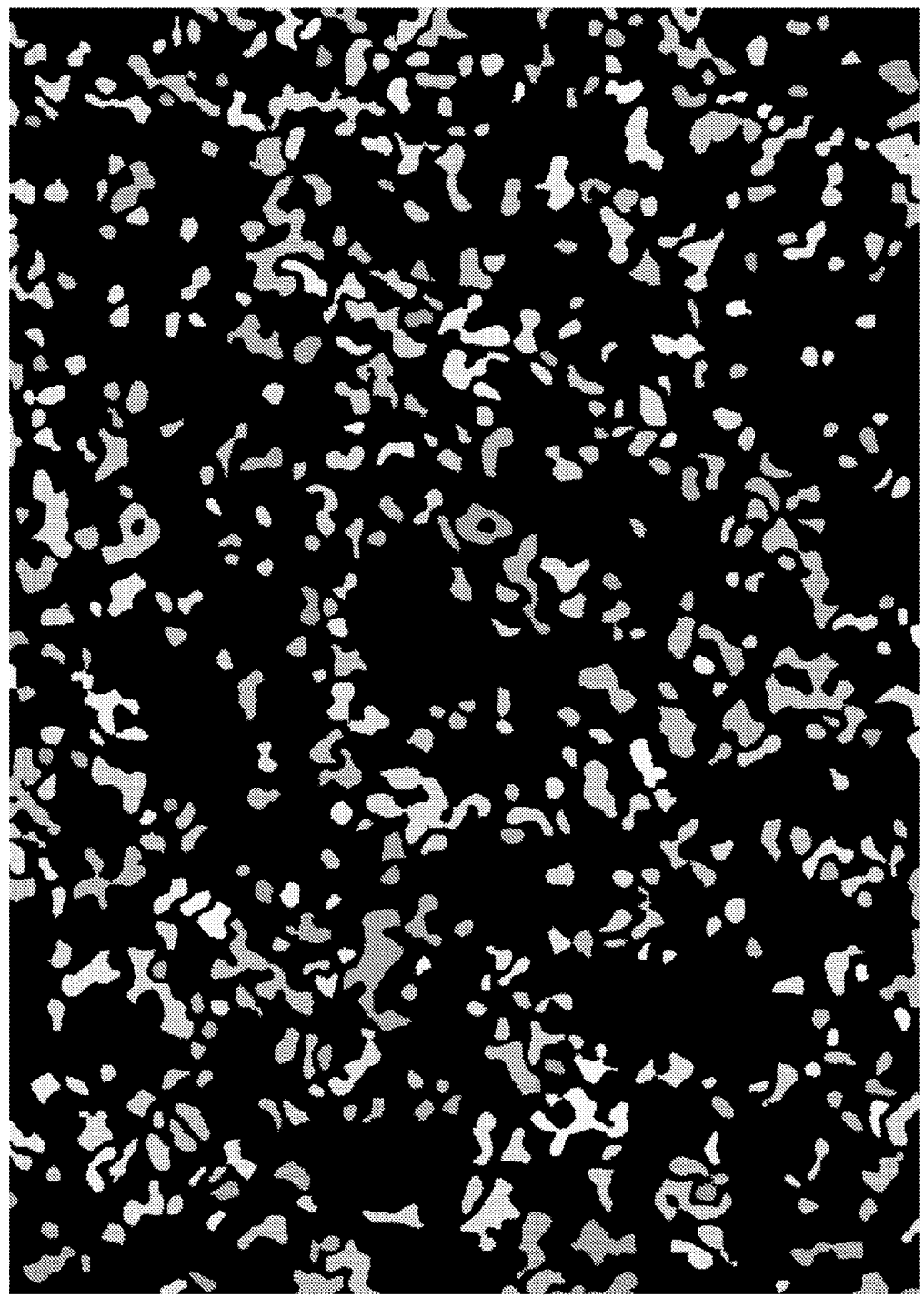
FIG. 5 is a schematic diagram of a plurality of different individual regions of interest in a sample in a field of view of the microscope system of FIG. 1A, 1B.

FIG. 5 is a schematic diagram of a plurality of different individual regions of interest in a sample in a field of view 500 of the microscope system of FIG. 1A, 1B. The field of view can include many individual features or regions of interest. To image the sample over time (e.g., to observe dynamics of the sample in the field of view) with the system of FIG. 1A, 1B, an image of the field of view can be obtained (e.g., through raster scanning of the field of view) with the microscope system of FIG. 1A, 1B to obtain an image of the spatial features of the sample in the field of view 500. Then, a sequence of images of the field of view can be obtained quickly by scanning the field of view and exciting single, individual regions of interest with individual columns of modulated light as the light is scanned across the field of view of the sample. With multi-pixel portions of regions of interest being excited at distinct point in time, the scan time to image a sample can be shorter than the scan time when each pixel is separately excited.

Figure 6A:
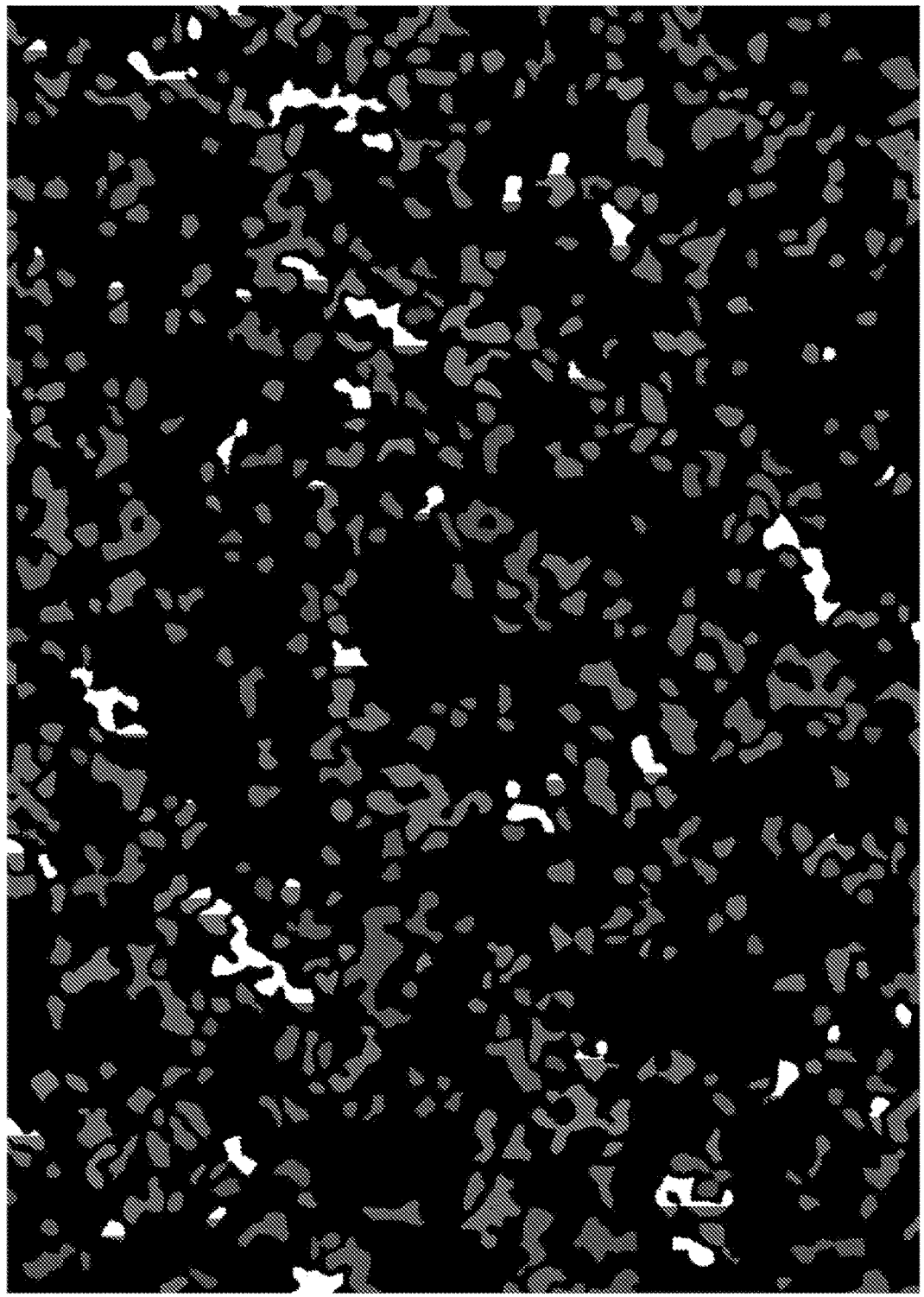
FIG. 6A is a schematic diagram of a first partial image of the different regions of interest of FIG. 3 acquired over a first scan time with the microscope system of FIG. 1A, 1B.
Figure 6B:
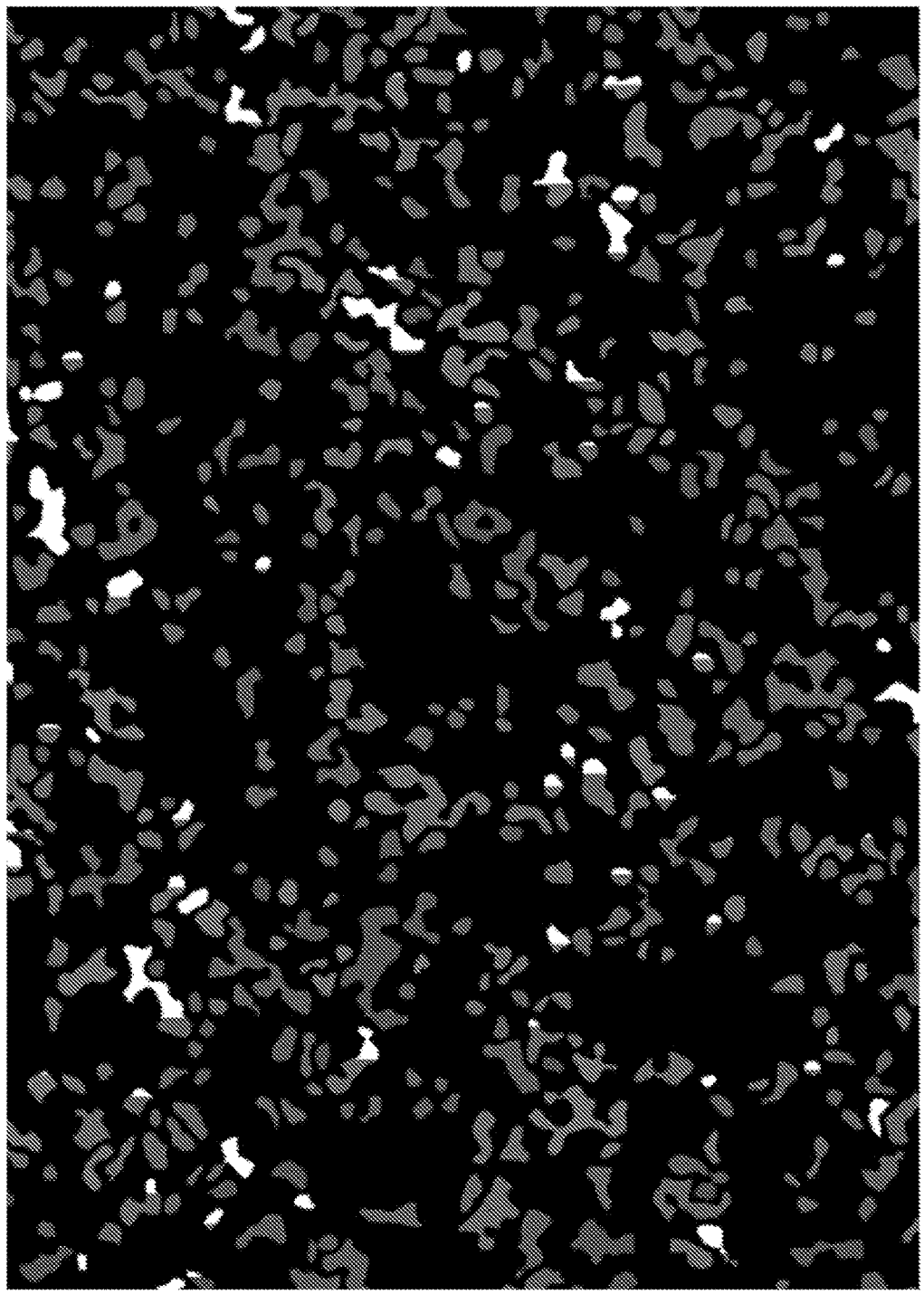
FIG. 6B is a schematic diagram of second partial image of the different regions of interest of FIG. 3 acquired over a second scan time with the microscope system of FIG. 1A, 1B.
Figure 6C:
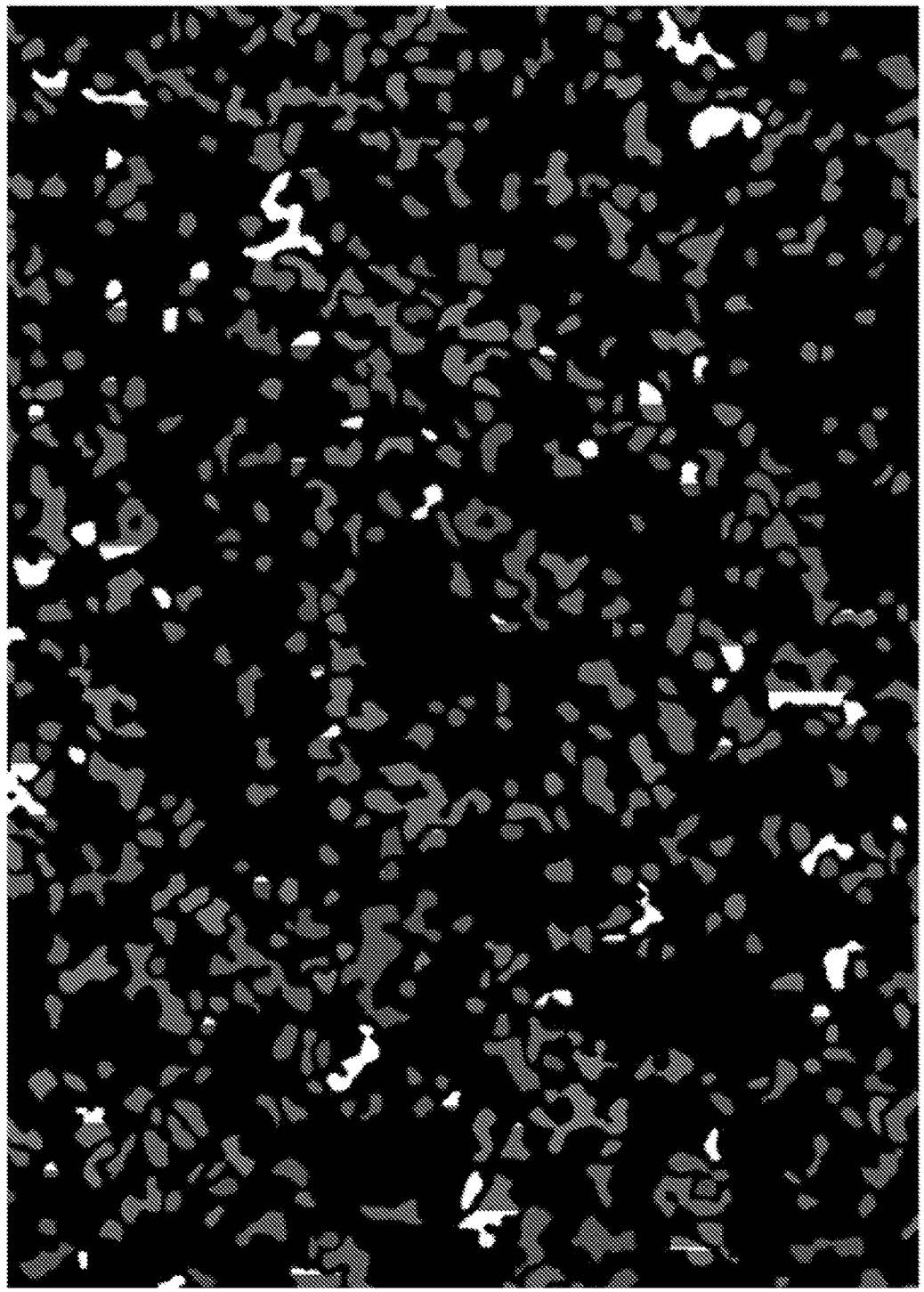
FIG. 6C is a schematic diagram of third partial image of the different regions of interest of FIG. 3 acquired over a third scan time with the microscope system of FIG. 1A, 1B.
Figure 6D:
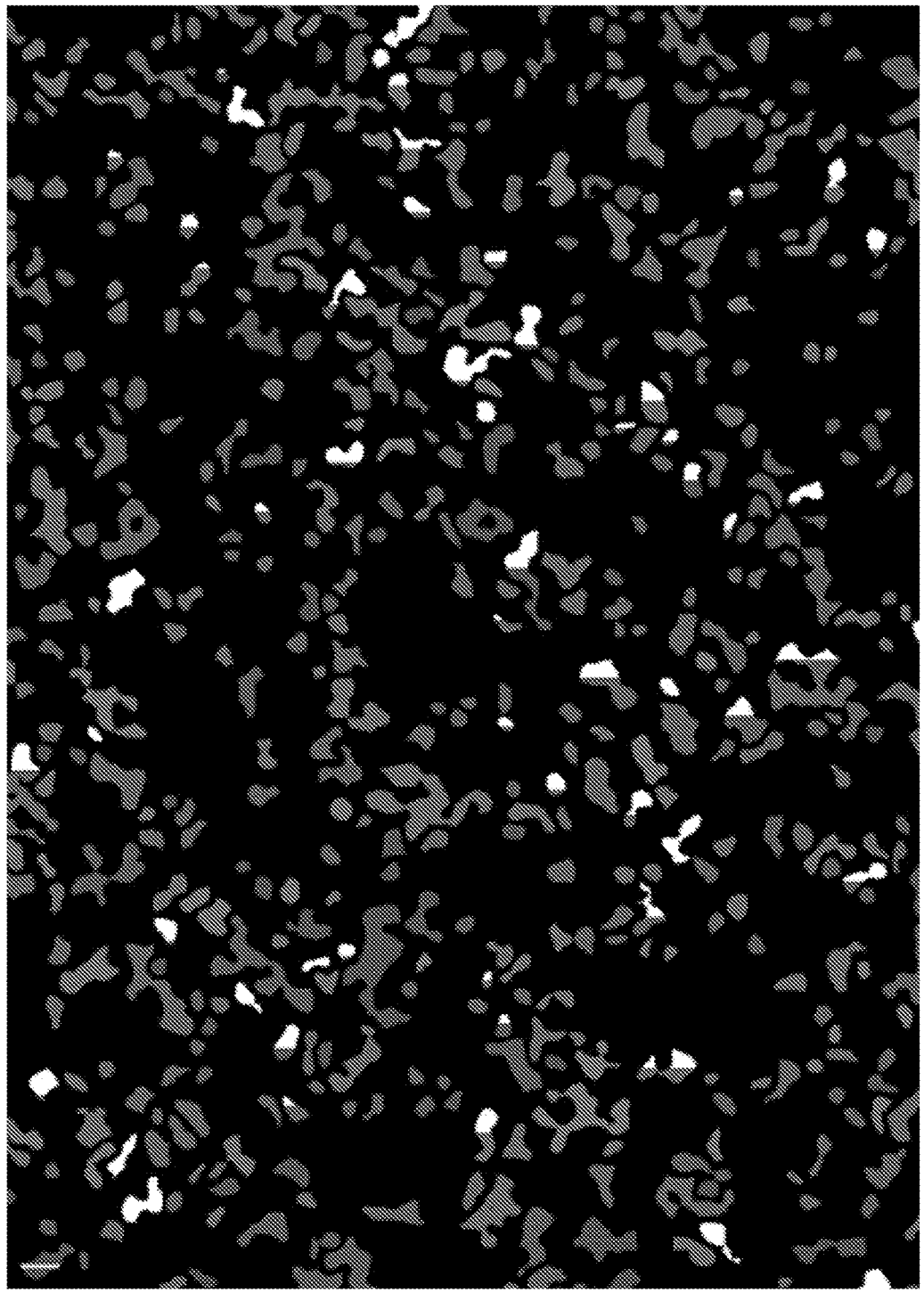
FIG. 6D is a schematic diagram of fourth partial image of the different regions of interest of FIG. 3 acquired over a fourth scan time with the microscope system of FIG. 1A, 1B.

For example, FIGS. 6A, 6B, 6C, 6D are schematic diagrams of a partial images of the different regions of interest of FIG. 5 acquired over a different scan times with the microscope system of FIG. 1A, 1B. FIG. 6A is a schematic diagram of first partial image of the different region of interest of FIG. 3 acquired over a first scan time with the microscope system of FIG. 1A, 1B, where the portions of the regions of interest imaged during the first scan time are shown in white, and unimaged regions of interest or portions of regions of interest are shown in grey. FIG. 6B is a schematic diagram of second partial image of the different region of interest of FIG. 3 acquired over a third scan time with the microscope system of FIG. 1A, 1B, where the portions of the regions of interest imaged during the second scan time are shown in white, and unimaged regions of interest or portions of regions of interest are shown in grey. FIG. 6C is a schematic diagram of third partial image of the different region of interest of FIG. 3 acquired over a third scan time with the microscope system of FIG. 1A, 1B, where the portions of the regions of interest imaged during the third scan time are shown in white, and unimaged regions of interest or portions of regions of interest are shown in grey. FIG. 6D is a schematic diagram of fourth partial image of the different region of interest of FIG. 3 acquired over a fourth scan time with the microscope system of FIG. 1A, 1B, where the portions of the regions of interest imaged during the fourth scan time are shown in white, and unimaged regions of interest or portions of regions of interest are shown in grey. This process can be repeated until all of all of the regions of interest in the field of view are excited by the DMD-modulated excitation light, and the light emitted from the sample in response to such excitation light is detected. The different partial images that are obtained from sequential scans of the line of excitation light over the DMD can be combined to form an image of the entire field of view of the sample, including all of the regions of interest.

In many implementations, multi-photon excitation involves the use of a pulsed laser beam, and extended focal patterns produced by such light sources are spatially coherent. DMDs generally act as diffractive elements with a mirror tilt geometry ('blaze') that requires collection of a nonzero diffraction order to efficiently modulate light. Collection of nonzero orders results in spectral dispersion and image plane tilt of the pulsed beam, which is not monochromatic but rather includes a range of frequency components due to the short temporal length of the pulse. This spectral dispersion and image plane tilt of the pulsed beam can be detrimental to many applications. At unit magnification, a tilted DMD image can be imaged into a sample without aberration by optics obeying Abbe's sine condition, but for non-unity magnification, aberrations are introduced, which can be removed by compensating for the image plane tilt.

Figure 7:
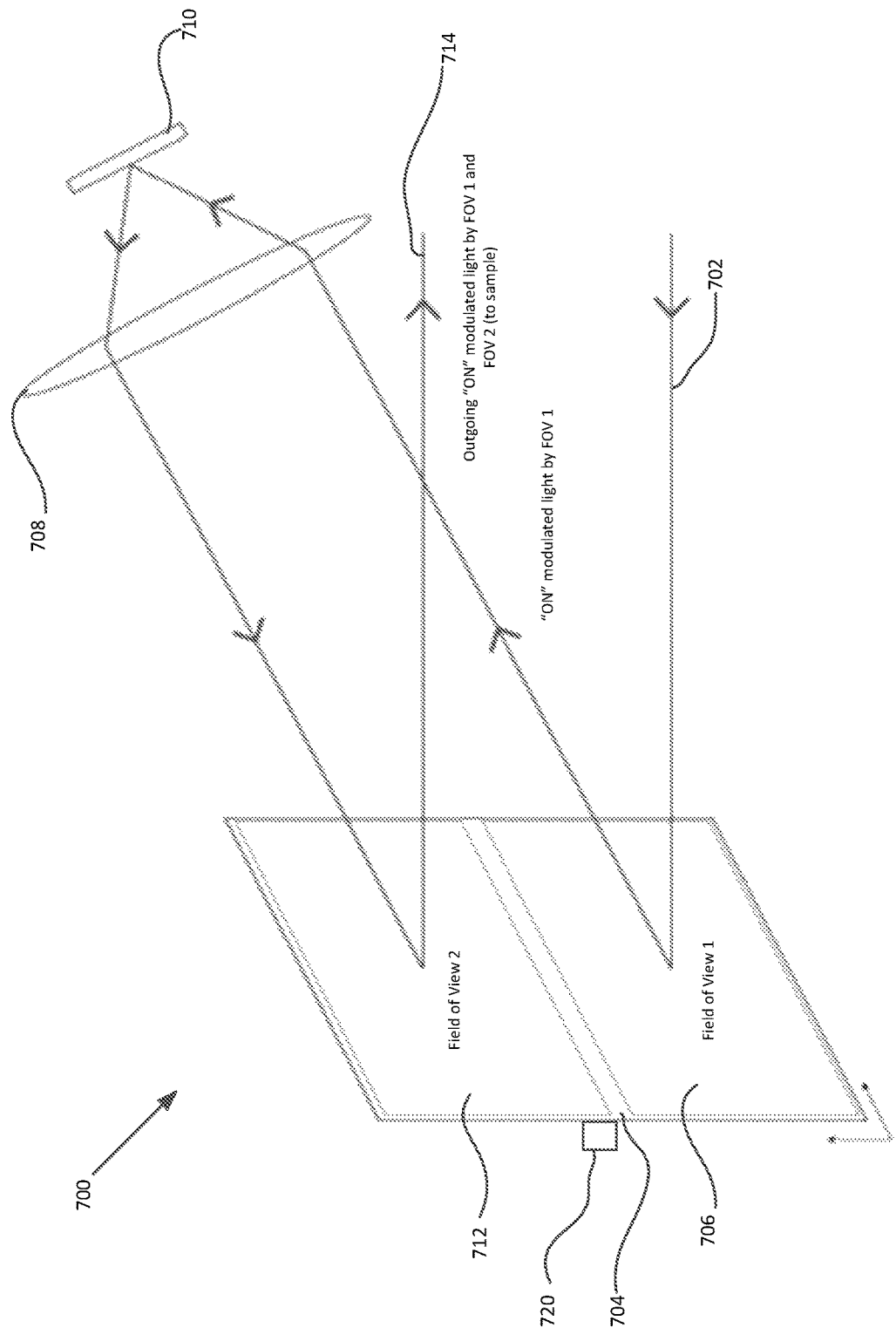
FIG. 7 is a schematic diagram of an optical system for mitigating image plane tilt and dispersion caused by reflecting a pulse of light off a DMD.

FIG. 7 is a schematic diagram of an optical system 700 for mitigating image plane tilt and dispersion caused by reflecting a pulse of light off a DMD. As shown in FIG. 7, component rays of the illumination beam may be focused on one or more axes and/or may have additional spatial structure. An incoming beam 702 can form an extended focus on the active DMD surface 704 and can be scanned across a first field of view 706 (i.e., in Field of View 1) of the DMD surface 704. Components of the beam reflected from the first field of view 706 are directed to a relay lens assembly 708 depending on the state of each pixel of the DMD. For example, micromirrors of the DMD corresponding to individual pixels can be individually oriented to direct light from the pixel into the relay lens assembly or away from the relay lens assembly. The relay lens assembly 708 may include multiple lenses and/or other optical elements, and its position may be fixed or adjustable. After passing through the relay lens assembly 708, light of the illumination beam can be reflected by a mirror 710 and passed a section time through the relay lens assembly 708, forming a scanned image on a second field of view 712 (i.e., in Field of View 2) of the DMD surface 704. Then, components of the outgoing beam 714 are directed on a path antiparallel to the incoming illumination beam 702 depending on the state of each pixel of the DMD. This outgoing beam 714 exits the DMD unit and is directed to the sample by additional optics.

Image plane tilt and dispersion caused by reflecting a pulse of light off a DMD surface can be mitigated by imaging, inverted, the surface of a first field of view 706 of the DMD onto a second field of view 712 of the DMD at unit magnification. The second field of view 712 can precisely compensate angular dispersion and image plane tilt of the first field of view 706. For ease of implementation, the first and second fields of view 706, 712 can be two subregions of a single planar DMD, and the re-imaging system can include a lens assembly and a mirror. In other implementations, different DMDs can be used to provide the first and second fields of view 706, 712, or a static grating could be used in place of a DMD at either the first or second field of view. This lens assembly 708 and mirror 710 can form a 1:1 image relay, having an optic axis intersecting the point equidistant between the centers of the two fields of view, an image plane intersecting the DMD at this point, and a pupil plane at the surface of the mirror.

DMDs used in the systems 100, 700 can be part of commercially available digital light processing ("DLP") chips, as sold by the manufacturer, or they may be modified to improve transmission and/or reflectivity to the illumination wavelengths used for a particular application, for example, by recoating mirror surfaces or protective windows, or by replacing components. In some implementations, the amplitude of the beam 702 beam can be modulated by one or the other of the first or second field of view 706, 712 of the DMD surface 704 (with the pixels of the other field of view that is not used to modulate the beam all set to the same 'ON' position). In some implementations, the image can be modulated by both the first and second field of view 706, 712 of the DMD surface 704, to increase modulation contrast. Modulation by two DMD fields of views reduces the effect of pixels that are stuck 'ON' on the modulated light. This geometry produces a modulated output beam traveling antiparallel to, and displaced relative to, the incoming illumination light, which can be relayed to the sample plane at any magnification.

In another implementation, a (one- or two-dimensional) diffraction grating having a period selected to match the same diffraction order spacing of a DMD surface 704 used to modulate the incoming light beam can be used in place of a second field of view of a DMD surface. In this case, only one DMD field of view is used.

To avoid nonlinear damage at the DMD surface 704 due to pulsed laser light, anomalous temporal dispersion (e.g., a 'prechirp') can be applied to the pulsed laser illumination to reduce peak power at the DMD surface 704 by spreading the energy of the laser pulse on the DMD surface over a longer time. One or more dispersive optical components can be inserted between the DMD and the sample plane to introduce temporal dispersion and to restore peak power of the laser at the sample plane.

The duty cycle of a DMD is limited by the time taken for micromirrors of the DMD to transition between states, which can limit the bandwidth of multiphoton excitation systems. Systems with higher bandwidth are desirable for many applications.

In some of the scanned geometries described herein, a high-illumination duty cycle can be achieved by flipping mirrors asynchronously, such that any individual mirror only flips its state while it is not illuminated. This results in a "rolling shutter" update of mirror states synchronized to the scanner, significantly improving bandwidth compared to SLM-based systems without scanning.

This "rolling shutter" update is not possible in every scanned geometry, for example, when re-imaging the field of view twice on a single DMD to mitigate the effects of dispersion and pulse front tilt cause by a single DMD modulation, as described above. Referring again to FIG. 1A, 1B, in such a geometry, duty cycles greater than 99% can be achieved by using multiple DMD modulation units (e.g., DMDs 126, 128 of FIG. 1A, 1B) that are scanned in sequence and combined at the sample 101. For example, while one DMD unit 126 undergoes its mirror flips, a different DMD unit 128 is scanned with a line of excitation light. These multiple DMD units 126, 128 can be illuminated by the same, or different, light sources, and can be scanned using the same, or different, scanners.

Referring again to FIG. 7, the DMD mirror flip signals used to synchronize mirror state transitions to the scan location may be generated by a light detector ("SOS detector") 720 placed such that the amount of illumination light directed into it depends on the location of the scanned beam, for example, by placing a reflective surface in an intermediate image plane adjacent to one edge of the scanned field of view, or by programming one or more regions of the DMD surfaces 704 to direct light to the SOS detector. For example, the position of the beam can be inferred by measuring when the SOS detector signal crosses a threshold value, or by comparing the temporal profile of this signal to a template. These operations can be performed by either digital or analog circuits.

Referring again to FIG. 1A, 1B, the outgoing beams from each DMD unit 126, 128 can be combined in their optical paths leading to the sample, for example, by giving pairs of beams orthogonal polarizations and combining them at a polarizing beam splitter 162, or by combining them at a non-polarizing beam splitter. The light provided by different DMD units can be combined to form coplanar images in the sample. The light provided by different DMD units 126, 128 also can be combined to form images at different depths along a z-axis of the sample 101, where the z-axis is parallel to the optical axis of the objective 166 that focuses excitation light into the sample 101, depending on the optics that relay light from each DMD unit 126, 128 to the sample 101. The location of the image of the active surface of each DMD unit 126, 128 in the sample 101 can be adjusted dynamically, for example, by moving scan mirrors (e.g., mirrors 150, 152) and lenses, or by remote focusing systems, such as tunable lenses or movable image relays. Moving the fields of view within the sample in these ways can be used to extend the field of view of the system and/or to pattern multiphoton excitation in three dimensions. Remote focusing systems can rapidly steer the excitation pattern to achieve volume excitation rates of over 1 kHz.

When the entire field of view of a given DMD unit is set to 'ON', the resulting measurements are a linear projection of the focal plane along columns (i.e., for a line focus, the sum of the focal plane brightness on one axis). If a subregion is set to 'ON', the resulting measurements are the corresponding linear projection of that subregion. Light from multiple DMD units 126, 128 can be combined at the sample 101 at arbitrary in-focal-plane rotations relative to each other, which enables tomographic measurements of the focal plane or subregions of the focal plane as selected by the DMD 'ON' patterns within each DMD unit.

Images of the sample can be produced by unmixing algorithms that estimate the pixels in the sample according their projection onto each measurement, for example, least squares linear unmixing, Weiner filtering, Richardson-Lucy deconvolution, gradient descent—based optimization, neural networks, or other methods.

Raster Imaging, Block ROI imaging, and tomographic imaging can be combined within a single scan by defining combinations of 'ON' patterns for different DMD units. These methods can be combined to produce a flexible, programmable, high resolution 3D microscope. Such a microscope can be capable of, for example, arbitrary programmable multiphoton excitation patterns at frame rates of over 20 kHz, and volume rates of over 1 kHz.

Figure 8:
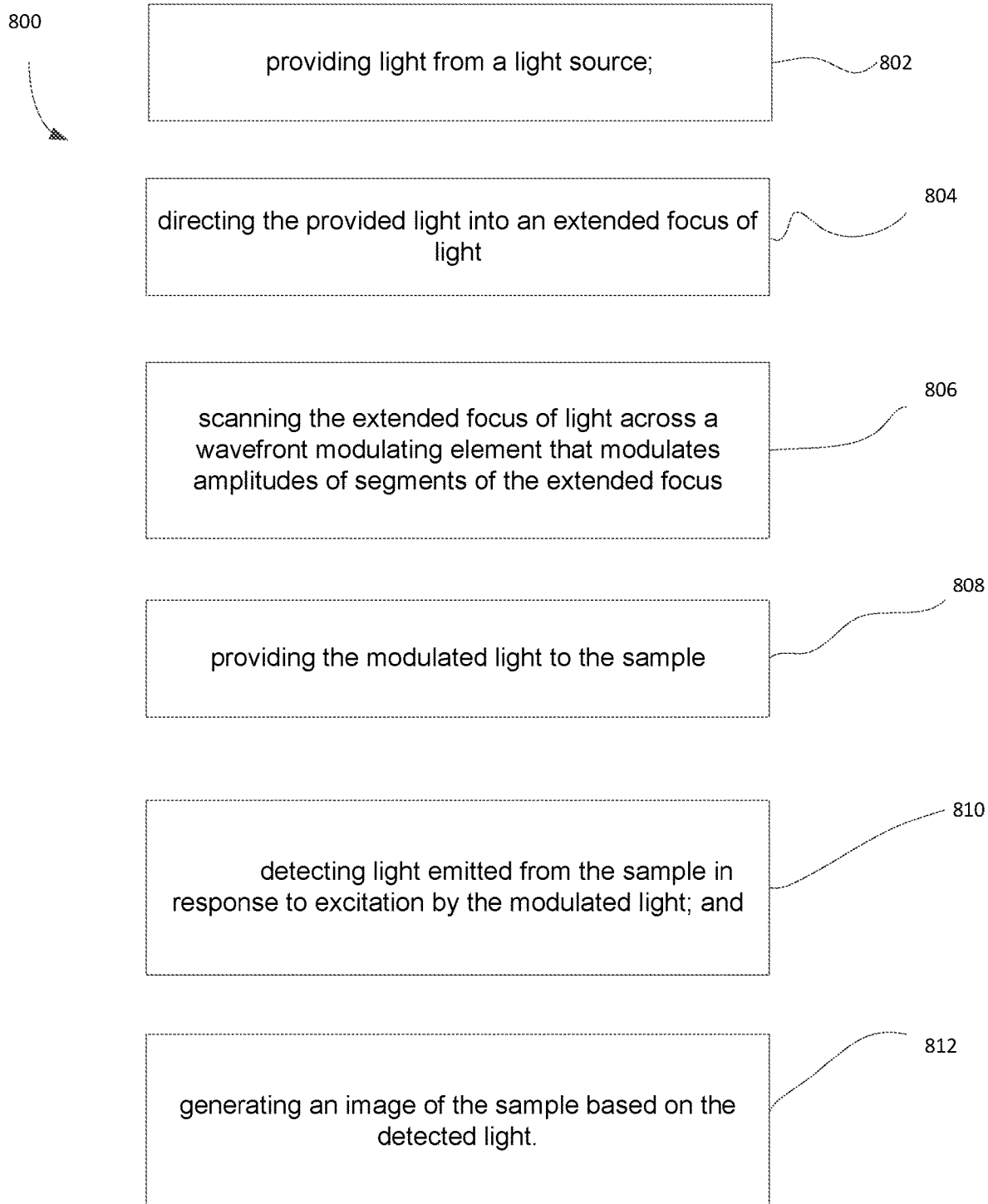
FIG. 8 is a flowchart of a process for generating an image of a sample.

FIG. 8 is a flowchart of a process 800 for generating an image of a sample. According to the process, light is provided from a light source (802). The provided light is directed into an extended focus of light (804). The extended focus of light is scanned across a wavefront modulating element that modulates amplitudes of segments of the extended focus (806). The modulated light is provided to the sample (808). Light emitted from the sample in response to excitation by the modulated light is detected (810). And an image of the sample is generated based on the detected light (812).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method of imaging a sample, the method comprising:
providing light from a light source;
directing the provided light into an extended focus of light;
scanning the extended focus of light across a wavefront modulating element a plurality of times, wherein the wavefront modulating element includes a pattern that modulates amplitudes of segments of the extended focus of light as the light is scanned;
providing different patterns on the wavefront modulating element during different times of the plurality of times that the extended focus is scanned across the wavefront modulating element, wherein the different patterns on the wavefront modulating element modulate amplitudes of segments of the extended focus of the light differently as the light is scanned;
providing the modulated light from the plurality of times the extended focus is scanned to the sample;
detecting light emitted from the sample in response to excitation by the modulated light; and
generating an image of the sample based on the detected light.

2. The method of claim 1, wherein the wavefront modulating element includes a DMD.

3. The method of claim 2, wherein scanning the extended focus across the DMD includes:
scanning the extended focus of light across a first field of view of the DMD;
imaging the scanned extended focus of light onto a mirror; and
scanning the extended focus of light imaged onto the mirror across a second field of view of the DMD.

4. The method of claim 1, wherein the modulated light provided to the sample is provided to the sample to form an amplitude-modulated line focus in the sample, wherein the amplitude-modulated line focus in the sample includes amplitude-modulated segments.

5. The method of claim 4, wherein a width of the amplitude-modulated line focus is specified by a resolution limit of an objective lens through which the amplitude-modulated line focus is provided to the sample.

6. The method of claim 4, wherein a length of the amplitude-modulated line focus is greater than 100 times a transverse width of the amplitude-modulated line focus.

7. The method of claim 1, wherein the extended focus is scanned across the wavefront modulating element at a rate of greater than 10 kHz and wherein the pattern is updated at a rate of greater than 10 kHz.

8. The method of claim 1, wherein generating the image of the sample includes generating the image based on a plurality of images of the sample corresponding to the different patterns on the wavefront modulating element when the extended focus is scanned across the wavefront modulating element.

9. The method of claim 8, wherein the generated image is a two-dimensional image.

10. The method of claim 8, further comprising changing a focal plane of the modulated light in the sample and wherein the wherein the generated image is a three- dimensional image.

11. The method of claim 1, wherein the detected light emitted from the sample in response to excitation by the modulated light is emitted in response to a two-photon excitation process.

12. The method of claim 1, further comprising:
scanning the extended focus across a first wavefront modulating element having a first pattern of ON and OFF pixels, which modulates amplitudes of segments of the light along the extended focus;
providing the modulated light by the first wavefront modulating element to the sample;
scanning the extended focus across a second wavefront modulating element having a second pattern of ON and OFF pixels, which modulates amplitudes of the light along the extended focus;
updating the second pattern while providing the light modulated by the first wavefront modulating element to the sample;
updating the first pattern while providing the light modulated by the second wavefront modulating element to the sample;
detecting light emitted from the sample in response to excitation by the light modulated by the first wavefront modulating element and the second wavefront modulating element; and
generating an image of the sample based on the detected light emitted from the sample.

13. The method of claim 1, wherein generating an image of the sample includes:
generating, based on the detected light emitted from the sample, a plurality of images of the sample corresponding to different time points;
determining whether each of a plurality of emitters in the plurality of images of the sample is active or non-active at the different time points.

14. A system for imaging a sample, the system comprising:
a light source configured for providing a light beam;
at least one focusing optical element configured for providing an extended focus of the light beam;
a wavefront modulating element;
at least one scanning optical element configured for scanning the extended focus across the wavefront modulating element a plurality of times, wherein the wavefront modulating element is configured for providing different patterns at different times of the plurality of times, which modulate amplitudes of segments of the extended focus of the light beam and wherein the different patterns provided by the wavefront modulating element modulate amplitudes of the segments of the extended focus of the light differently as the light is scanned;
an objective configured for providing the modulated extended focus of light to the sample;
at least one detector configured for detecting light emitted from the sample in response to excitation by the modulated light; and at least one processor configured for generating an image of the sample based on the detected light.

15. The system of claim 14, wherein the wavefront modulating element includes a DMD.

16. The system of claim 15, wherein scanning the extended focus across the DMD includes:
   scanning the extended focus of light across a first field of view of the DMD;
   imaging the scanned extended focus of light onto a mirror; and
   scanning the extended focus of light imaged onto the mirror across a second field of view of the DMD.

17. The system of claim 14, wherein the modulated extended focus of light provided to the sample is provided to the sample to form an amplitude-modulated line focus in the sample.

18. The system of claim 17, wherein a width of the amplitude-modulated line focus is specified by a resolution limit of an objective lens through which the amplitude-modulated line focus is provided to the sample.

19. The system of claim 14, wherein the extended focus is scanned across the wavefront modulating element at a rate of greater than 10 kHz and wherein the pattern is updated at a rate of greater than 10 KHz.

20. The system of claim 14, wherein generating an image of the sample includes generating the image based on a plurality of images of the sample corresponding to the different patterns on the wavefront modulating element when the extended focus is scanned across the wavefront modulating element.

21. The system of claim 20, wherein the generated image is a two-dimensional image.

22. The system of claim 20, wherein the generated image is a three-dimensional image.

23. The system of claim 14, wherein the detected light emitted from the sample in response to excitation by the modulated light is emitted in response to a two-photon excitation process.

24. A method comprising:
   providing light from a light source;
   directing the provided light into an extended focus of light;
   scanning the extended focus of light across a wavefront modulating element a plurality of times, wherein the wavefront modulating element includes a pattern that modulates amplitudes of segments of the extended focus of light as the light is scanned;
   providing different patterns on the wavefront modulating element during different times of the plurality of times that the extended focus is scanned across the wavefront modulating element, wherein the different patterns on the wavefront modulating element modulate amplitudes of segments of the extended focus of the light differently as the light is scanned; and
   providing the modulated light from the plurality of times the extended focus is scanned to a sample.

25. The method of claim 24, wherein a length of the amplitude-modulated line focus is greater than 100 times a transverse width of the amplitude-modulated line focus.

26. The method of claim 24, wherein the extended focus is scanned across the DMD at a rate of greater than 10 kHz and wherein the pattern is updated at a rate of greater than 10 KHz.

27. The method of claim 24, further comprising:
   scanning the extended focus across a first DMD having a first pattern of ON and OFF pixels, which modulates amplitudes of segments of the light along the extended focus;
   providing the modulated light by the first DMD to the sample;
   scanning the extended focus across a second DMD having a second pattern of ON and OFF pixels, which modulates amplitudes of the light along the extended focus;
   updating the second pattern while providing the light modulated by the first DMD to the sample; and
   updating the first pattern while providing the light modulated by the second DMD to the sample.

* * * * *